United States Patent
Allen

(10) Patent No.: US 12,129,190 B1
(45) Date of Patent: Oct. 29, 2024

(54) DESALINATION PLANT

(71) Applicant: MARC Water Services, LLC, Hempstead, TX (US)

(72) Inventor: Michael D. Allen, Hempstead, TX (US)

(73) Assignee: MARC Water Services, LLC, Hempstead, TX (US)

( * ) Notice: Subject to any disclaimer, the term of this patent is extended or adjusted under 35 U.S.C. 154(b) by 0 days.

(21) Appl. No.: 18/542,669

(22) Filed: Dec. 16, 2023

Related U.S. Application Data

(60) Provisional application No. 63/433,018, filed on Dec. 16, 2022.

(51) Int. Cl.
| | |
|---|---|
| *C02F 1/48* | (2023.01) |
| *C02F 1/26* | (2023.01) |
| *C02F 1/44* | (2023.01) |
| *C02F 1/74* | (2023.01) |
| *C02F 101/10* | (2006.01) |
| *C02F 103/08* | (2006.01) |

(52) U.S. Cl.
CPC ............. *C02F 1/484* (2013.01); *C02F 1/265* (2013.01); *C02F 1/441* (2013.01); *C02F 1/444* (2013.01); *C02F 1/74* (2013.01); *C02F 2101/10* (2013.01); *C02F 2103/08* (2013.01); *C02F 2201/007* (2013.01)

(58) Field of Classification Search
CPC .......... C02F 1/484; C02F 1/265; C02F 1/441; C02F 1/444; C02F 1/74; C02F 2101/10; C02F 2103/08; C02F 2201/007
See application file for complete search history.

(56) References Cited

U.S. PATENT DOCUMENTS

| | | |
|---|---|---|
| 4,169,789 A | 10/1979 | Lerat |
| 4,574,049 A | 3/1986 | Pittner |
| 4,724,079 A | 2/1988 | Sale et al. |
| 6,030,535 A * | 2/2000 | Hayashi ................ B01D 61/58 210/663 |
| 6,349,835 B1 | 2/2002 | Saux et al. |

(Continued)

FOREIGN PATENT DOCUMENTS

CN 2677366 Y 2/2005

OTHER PUBLICATIONS

Lenntech, Key Issues in Seawater Desalination, http://www.lenntech.com/processes/desalination/general/desalination-key-issue.htm (2009).

(Continued)

*Primary Examiner* — Terry K Cecil
(74) *Attorney, Agent, or Firm* — Mackey Law Firm PLLC

(57) ABSTRACT

A system for cleaning water can include an intake configured to receive input water, a pump configured to move the input water through at least a portion of the system, a discharge for discharging output water, an electromagnet configured to expose the input water to a magnetic field fluidically between the intake and the discharge, a course filter unit configured to filter the input water fluidically between the intake and the discharge, a nano-bubble injector configured to inject nanobubbles into the input water fluidically between the intake and the discharge, and an ultra-filtration filter configured to filter the input water fluidically between the intake and the discharge. A system for cleaning water can include a system for producing potable fresh water from seawater.

19 Claims, 17 Drawing Sheets

(56) References Cited

U.S. PATENT DOCUMENTS

| | | |
|---|---|---|
| 6,800,201 B2 | 10/2004 | Bosley |
| 6,946,081 B2 | 9/2005 | Voutchkov |
| 6,998,053 B2 | 2/2006 | Awerbuch |
| 7,153,423 B2 | 12/2006 | Gordon et al. |
| 7,455,109 B2 | 11/2008 | Collins |
| 7,563,375 B2 | 7/2009 | Liberman |
| 8,070,954 B2 | 12/2011 | Ito et al. |
| 2006/0283802 A1 | 12/2006 | Gordon |
| 2007/0138096 A1 | 6/2007 | Tarr et al. |
| 2008/0011689 A1* | 1/2008 | Gordon ............... B01D 61/025 |
| | | 210/170.11 |
| 2009/0152197 A1 | 6/2009 | Lilas et al. |
| 2012/0067820 A1 | 3/2012 | Henthorne et al. |
| 2012/0152546 A1 | 6/2012 | Polizzotti et al. |
| 2015/0344330 A1 | 12/2015 | Schambough et al. |

OTHER PUBLICATIONS

Watereuse Association, Overview of Desalination Plant Intake Alternatives, https://www.watereuse.org/wp-content/uploads/2015/10/Intake_White_Paper.pdf (2011).

Sydney Desal, Sydney Desalination Plant, http://www.sydneydesal.com.au/how-we-do-it/infrastructure/ (2015).

* cited by examiner

DESALINATION PLANT

CROSS REFERENCE TO RELATED APPLICATIONS

This application claims the benefit of U.S. Provisional Patent Application No. 63/433,018 filed Dec. 16, 2022, the entire contents of which are hereby incorporated by reference herein.

BACKGROUND OF THE INVENTION

Field of the Invention. The present disclosure generally relates to the production of fresh water and more specifically to a desalination plant that can produce fresh water from seawater.

Description of the Related Art Even as climate change makes rainfall less predictable and drought conditions more prevalent, the world's demand for fresh potable water is rapidly increasing. Population growth is a major factor in this increased demand for fresh water, not only the need for drinking water and sanitation but also the need to produce more food. For example, agriculture typically accounts for 60-70% of water use around the world.

While reducing water consumption on an individual level is one way of helping to address the water crisis, it is far from the complete solution. Something on a larger scale is desperately needed and a growing number of countries are turning to desalination. The term desalination is used to refer to removing salt and minerals from both seawater and subterranean "brackish" water, as well as the treatment of waste water (aka sewerage) to make it drinkable.

Many areas of the world such as the Middle East, Singapore, the Canary Islands and the Caribbean do not have a viable alternative to desalination as a means of increasing their fresh water supply. Other areas that have a choice of water supply sources like Europe, the United States, China, and Japan will try conservation, re-use and brackish water treatment with seawater desalination used to provide some drought-resistance and emergency water supply.

Some environmentalists have long opposed desalinations from the ocean because of the energy the process demands, as well as the impact of sucking in large quantities of seawater from the ocean and discharging large quantities of heavy brine back into the ocean. The location of a seawater desalination plant also makes a difference, since the salt content of water off the coast of California is about 34,000 parts per million and off the coast of the Middle East is more like 40,000 parts per million.

A need exists in the art for improved means of desalinating seawater and minimizing the environmental impact of the process.

BRIEF SUMMARY OF THE INVENTION

Applicant has created improved devices, assemblies, systems and methods for cleaning or treating water, which can include producing potable fresh water from seawater, or otherwise cleaning contaminated, dirty or non-potable water to produce water clean enough to be utilized for a desired purpose (e.g., agricultural use or other uses that do not necessarily require potability). For example, in at least one embodiment, systems and methods of the disclosure can be configured to clean or treat input water (e.g., saltwater or other water containing one or more contaminants, such as metals, minerals or other undesired substances) for producing output water (e.g., potable water or another desired grade of water of a higher quality than the input water). Thus, while one or more embodiments of the disclosure are described in the context of desalination for exemplary purposes, in at least one embodiment, systems and methods of the disclosure can be configured for other water treatment or cleaning implementations. Similarly, embodiments of the present disclosure are not necessarily limited to offshore use or locations and, in at least one embodiment can be implemented on one or more skids, trailers, or other support structures. Furthermore, in at least one embodiment, systems and methods of the disclosure can be modular or adaptable according to a given physical implementation and related goals. Thus, not every embodiment need include every component of another embodiment, as embodiments of the disclosure can be adapted for a given physical implementation according to the type or degree of output water desired.

In at least one embodiment, a system for cleaning water can include an intake configured to receive input water, a pump configured to move the input water through at least a portion of the system, a discharge for discharging output water, an electromagnet configured to expose the input water to a magnetic field fluidically between the intake and the discharge, a course filter unit configured to filter the input water fluidically between the intake and the discharge, a nano-bubble injector configured to inject nanobubbles into the input water fluidically between the intake and the discharge, and an ultrafiltration filter configured to filter the input water fluidically between the intake and the discharge. In at least one embodiment, a system for cleaning water can be or include a system for producing potable fresh water from seawater, such as a desalination plant.

In at least one embodiment, a method can include moving input water into an intake, such as via one or more pumps, exposing the input water to a magnetic field created by one or more electromagnets for aligning, elongating or weakening one or more molecules, routing the input water through one or more course filters, routing the input water through a nano-bubble injector, injecting nanobubbles into the input water, routing the input water through a second, finer filter, such as a ceramic or other ultrafiltration filter, and routing output water to a discharge.

In at least one embodiment, a desalination plant can include an apparatus and/or a process for producing potable water from seawater and can include a subsurface discharge line for diluted heavy brine. In at least one embodiment, a desalination plant can include an apparatus and/or process for controlling the dilution of heavy brine, such as that discharged from a reverse osmosis desalination plant, with seawater and/or the subsea level at which the diluted heavy brine is dispersed into the ocean. In at least one embodiment, a desalination plant can operate offshore and/or pump potable water ashore.

In at least one embodiment, a desalination plant can include a plant deck. In at least one embodiment, a desalination plant can include one or more intake lines. Each intake line can include an intake end submerged at least 400 feet below sea level. In at least one embodiment, a desalination plant can include an intake filter that filters the seawater entering each intake end of the intake lines. The intake filter can have a pore size of less than or equal to 5.0 mm. In at least one embodiment, a desalination plant can include a coarse filter unit, which can be positioned proximally to a first end of a top side of the plant deck. The coarse filter unit can have a pore size of less than or equal to 5.0 mm. In at least one embodiment, a desalination plant can include a plurality of reverse osmosis units, which can be positioned proximally to a second end of a top side of the plant deck. In at least one embodiment, a desalination plant can include a fine filter unit positioned on a top side of the plant deck, such as proximally to the coarse filter unit. The fine filter unit can have a pore size of less than or equal to 10.0 microns. In at least one embodiment, a desalination plant can include a first intake line in fluid communication with the intake filter, the coarse filter unit, the fine filter unit, and a first end of the reverse osmosis units. In at least one embodiment, a desalination plant can include a fresh water line that discharges potable water from a second end of the reverse osmosis units. In at least one embodiment, a desalination plant can include a heavy brine line that discharges heavy brine from the reverse osmosis units. In at least one embodiment, a desalination plant can include a second intake line in fluid communication with the intake filter. The second intake line can transport filtered seawater from the intake filter to the heavy brine line where the filtered seawater dilutes the heavy brine discharged from the osmosis units. In at least one embodiment, a desalination plant can include a mixing device that mixes the heavy brine from the heavy brine line and the seawater entering the heavy brine line from the second intake line. In at least one embodiment, a desalination plant can include a submerged discharge line having a plurality of spaced apart dispersant units.

In at least one embodiment, a method of producing potable fresh water can include drawing seawater through at least one marine life extractor, which can be positioned at least 400 feet below a surface of a body of seawater. In at least one embodiment, the marine life extractor can be positioned at least 100 feet above a seabed of the body of seawater. In at least one embodiment, a method of producing potable fresh water can include pumping at least some of the seawater through at least one filter creating filtered seawater.

In at least one embodiment, a method of producing potable fresh water can include pumping the filtered seawater through at least one desalination device creating fresh water and brine. In at least one embodiment, the desalination device can include a reverse osmosis device. In at least one embodiment, the desalination device can include a distillation device. In at least one embodiment, the desalination device can include an electro-dialysis device. In at least one embodiment, the desalination device can include a lithium extraction device.

In at least one embodiment, a method of producing potable fresh water can include mixing the brine with at least some of the seawater creating diluted brine. In at least one embodiment, effluent captured in the filter can be mixed with the brine before discharging the diluted brine.

In at least one embodiment, a method of producing potable fresh water can include discharging the diluted brine at least 400 feet below the surface of the body of seawater. In at least one embodiment, the diluted brine can be discharged at least 100 feet above a seabed of the body of seawater.

In at least one embodiment, effluent captured in the filter can be discharged within 100 feet of the surface of the body of seawater. In at least one embodiment, one or more minerals can be mined from effluent captured in the at least one filter.

In at least one embodiment, a desalination plant can include one or more marine life extractors, which can be positioned at least 400 feet below a surface of a body of seawater. In at least one embodiment, the marine life extractor can be positioned at least 100 feet above a seabed of the body of seawater.

In at least one embodiment, a desalination plant can include a pump configured to draw seawater through the marine life extractor. In at least one embodiment, a desalination plant can include one or more filters configured to extract filtered seawater and effluent from the seawater.

In at least one embodiment, a desalination plant can include one or more desalination devices configured to extract fresh water and/or brine from the filtered seawater. In at least one embodiment, the desalination device can include a reverse osmosis device. In at least one embodiment, the desalination device can include a distillation device. In at least one embodiment, the desalination device can include an electro-dialysis device. In at least one embodiment, the desalination device can include a lithium extraction device.

In at least one embodiment, a desalination plant can include a mixing device configured to mix the brine with at least some of the seawater creating diluted brine. In at least one embodiment, the mixing device can also be configured to mix effluent captured in the at least one filter with the brine.

In at least one embodiment, a desalination plant can include a discharge pipe configured to discharge the diluted brine at least 400 feet below the surface of the body of seawater. In at least one embodiment, the discharge pipe can also be configured to discharge the diluted brine at least 100 feet above a seabed of the body of seawater.

In at least one embodiment, a desalination plant can include an effluent pipe configured to discharge effluent captured in the filter within 100 feet of the surface of the body of seawater. In at least one embodiment, a desalination plant can include an extraction device for extracting one or more minerals from effluent captured in the filter.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
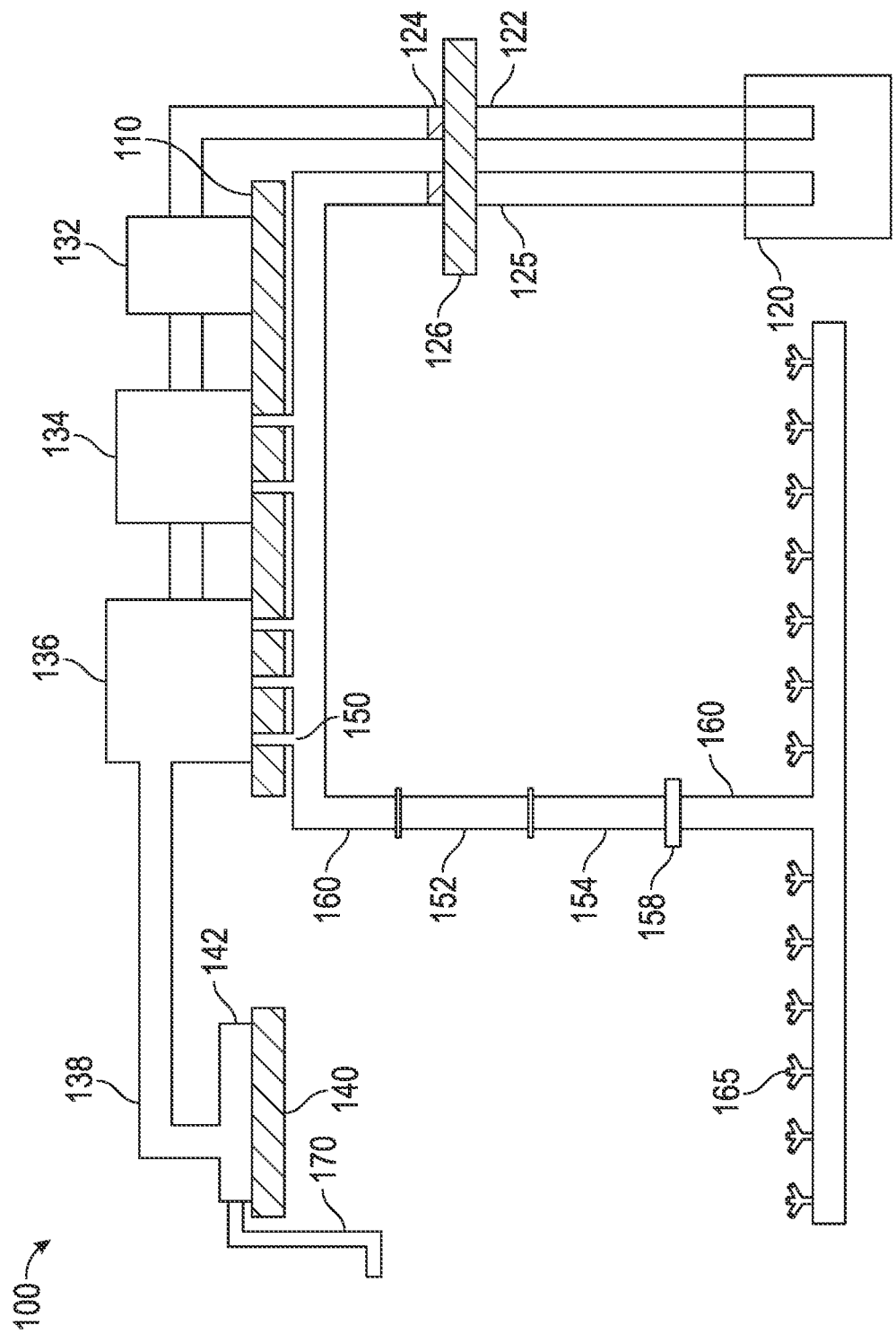
FIG. 1 is a schematic view of one of many embodiments of a desalination plant according to the disclosure.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions can include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Unless otherwise indicated, the term "liquid(s)" as used herein includes both pure liquids and impure liquids, including but not limited to mixtures, combinations of immiscible liquids and one or more liquids mixed or otherwise combined with one or more non-liquids. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Applicant has created improved devices, assemblies, systems and methods for cleaning or treating water, which can include producing potable fresh water from seawater, or otherwise cleaning contaminated, dirty or non-potable water to produce water clean enough to be utilized for a desired purpose (e.g., agricultural use or other uses that do not necessarily require potability). For example, in at least one embodiment, systems and methods of the disclosure can be configured to clean or treat input water (e.g., saltwater or other water containing one or more contaminants, such as metals, minerals or other undesired substances) for producing output water (e.g., potable water or another desired grade of water of a higher quality than the input water). Thus, while one or more embodiments of the disclosure are described in the context of desalination for exemplary purposes, in at least one embodiment, systems and methods of the disclosure can be configured for other water treatment or cleaning implementations. Similarly, embodiments of the present disclosure are not necessarily limited to offshore use or locations and, in at least one embodiment can be implemented on one or more skids, trailers, or other support structures. Furthermore, in at least one embodiment, systems and methods of the disclosure can be modular or adaptable according to a given physical implementation and related goals. Thus, not every embodiment need include every component of another embodiment, as embodiments of the disclosure can be adapted for a given physical implementation according to the type or degree of output water desired.

Figure 2:
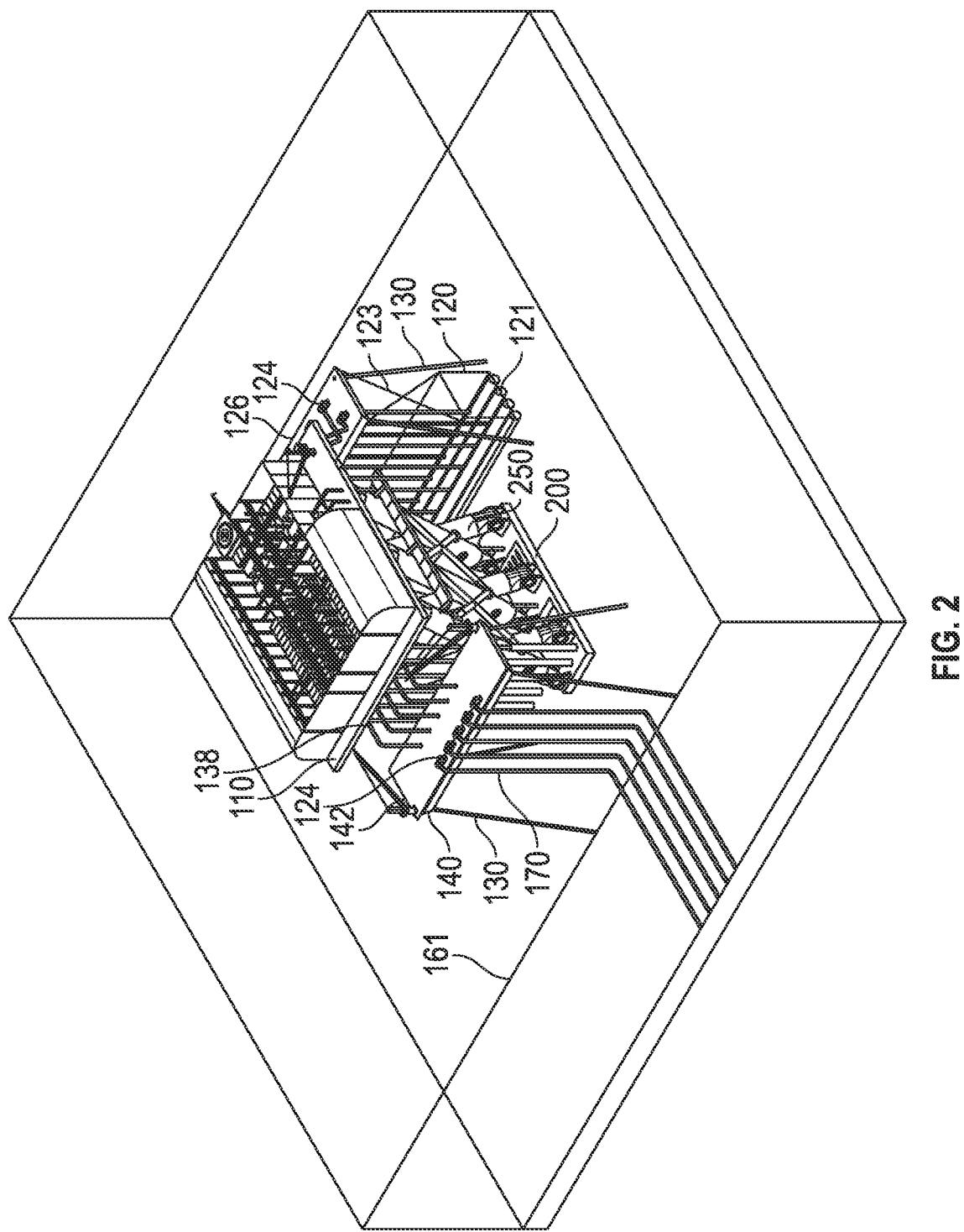
FIG. 2 is a plan view of one of many embodiments of one embodiment of a desalination plant according to the disclosure.
Figure 3:
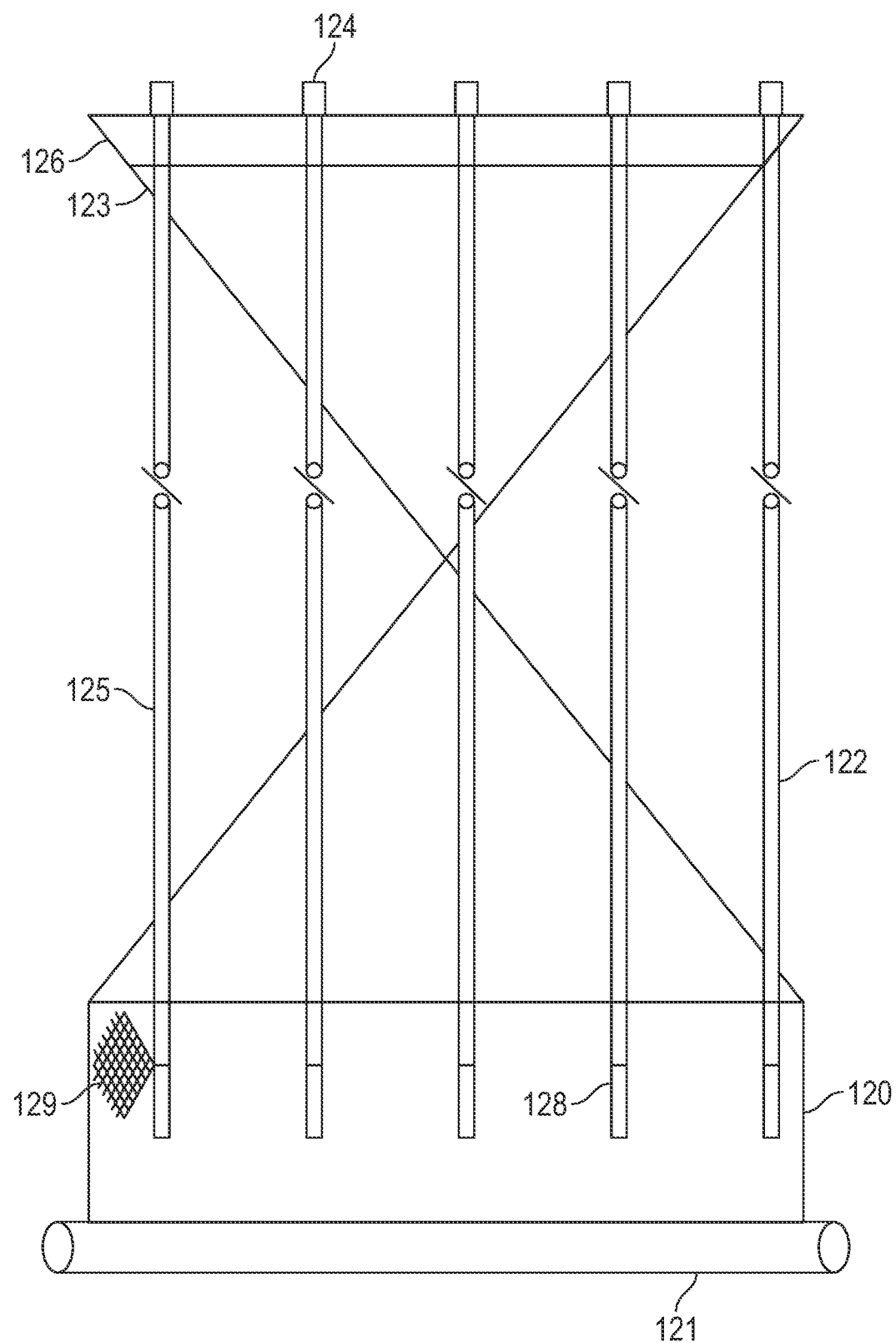
FIG. 3 is a side view of one of many embodiments of one embodiment of a seawater intake system according to the disclosure.
Figure 4:
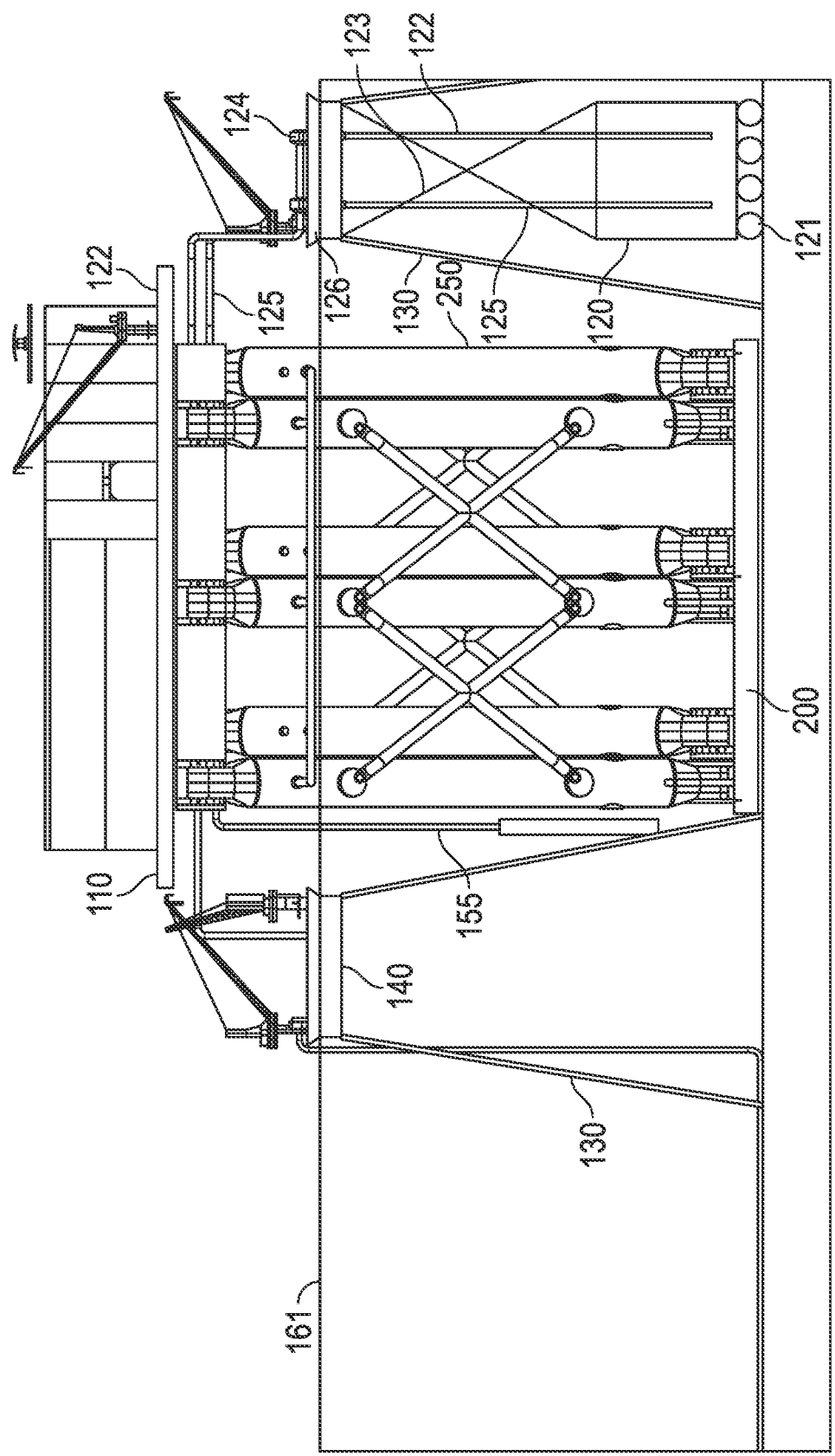
FIG. 4 is a side view of the desalination plant shown in FIG. 2.
Figure 5:
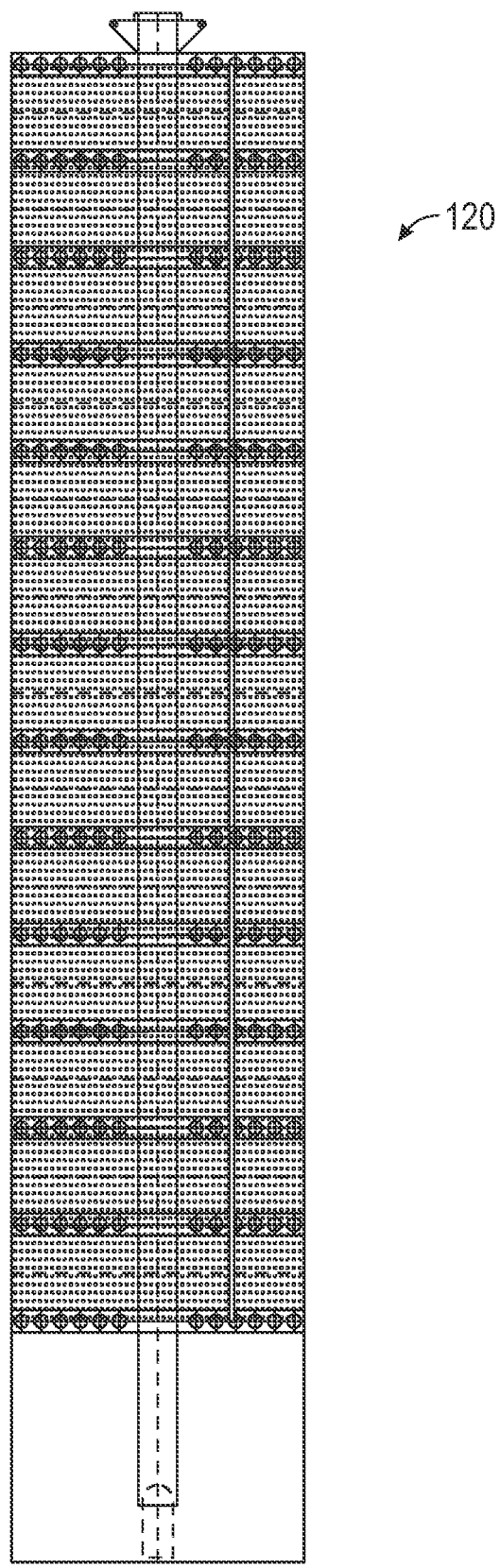
FIG. 5 is an elevation view of one of many embodiments of a seawater intake system for use with a desalination plant according to the disclosure.
Figure 6:
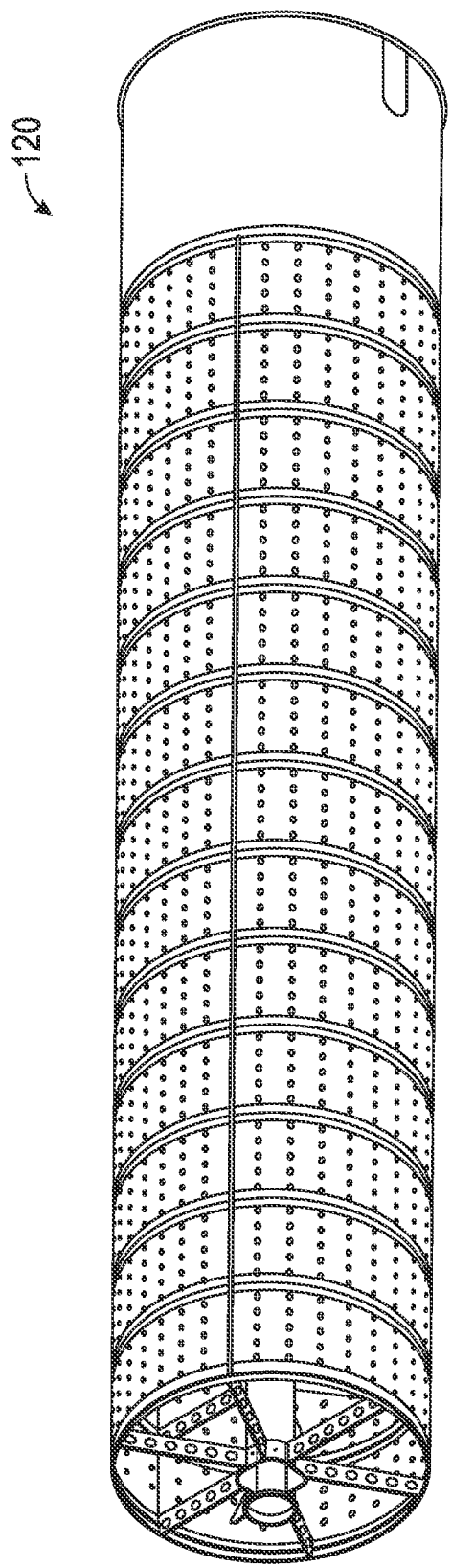
FIG. 6 is a perspective view of the seawater intake system shown in FIG. 5.
Figure 7:
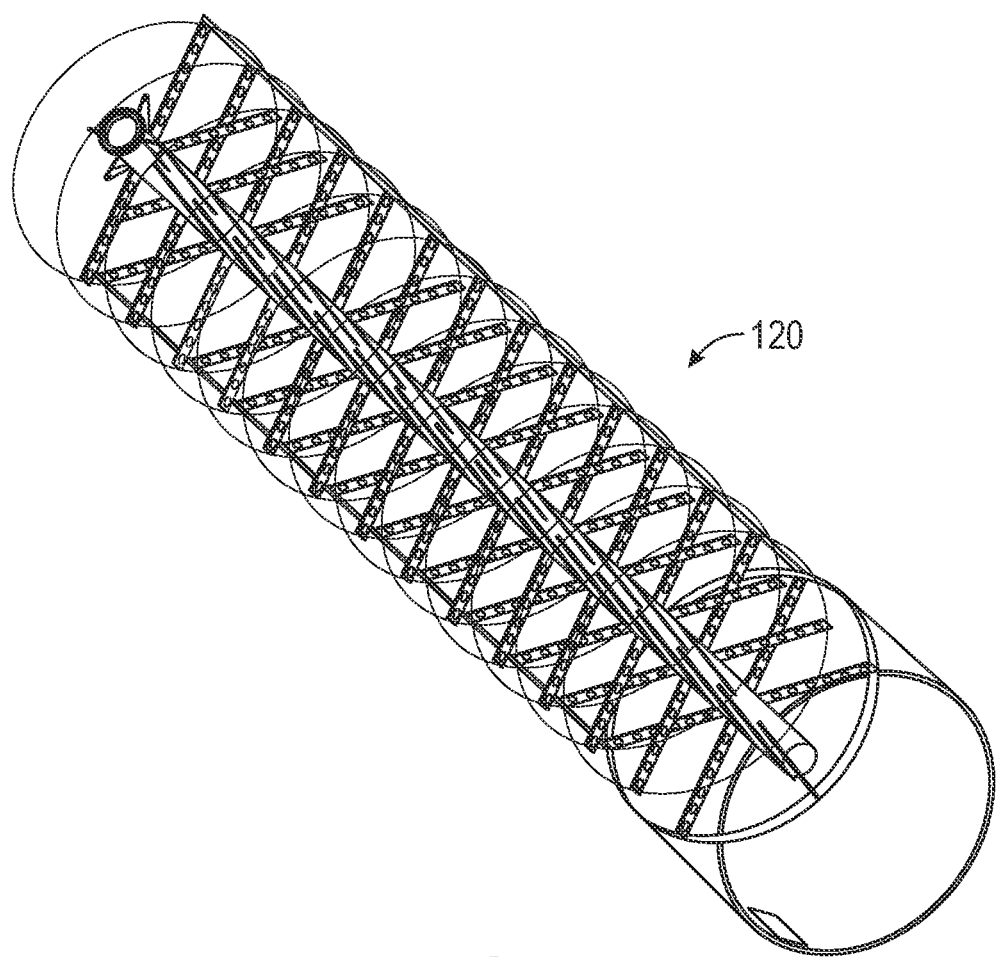
FIG. 7 is a partial perspective view of the seawater intake system shown in FIG. 5.
Figure 8:
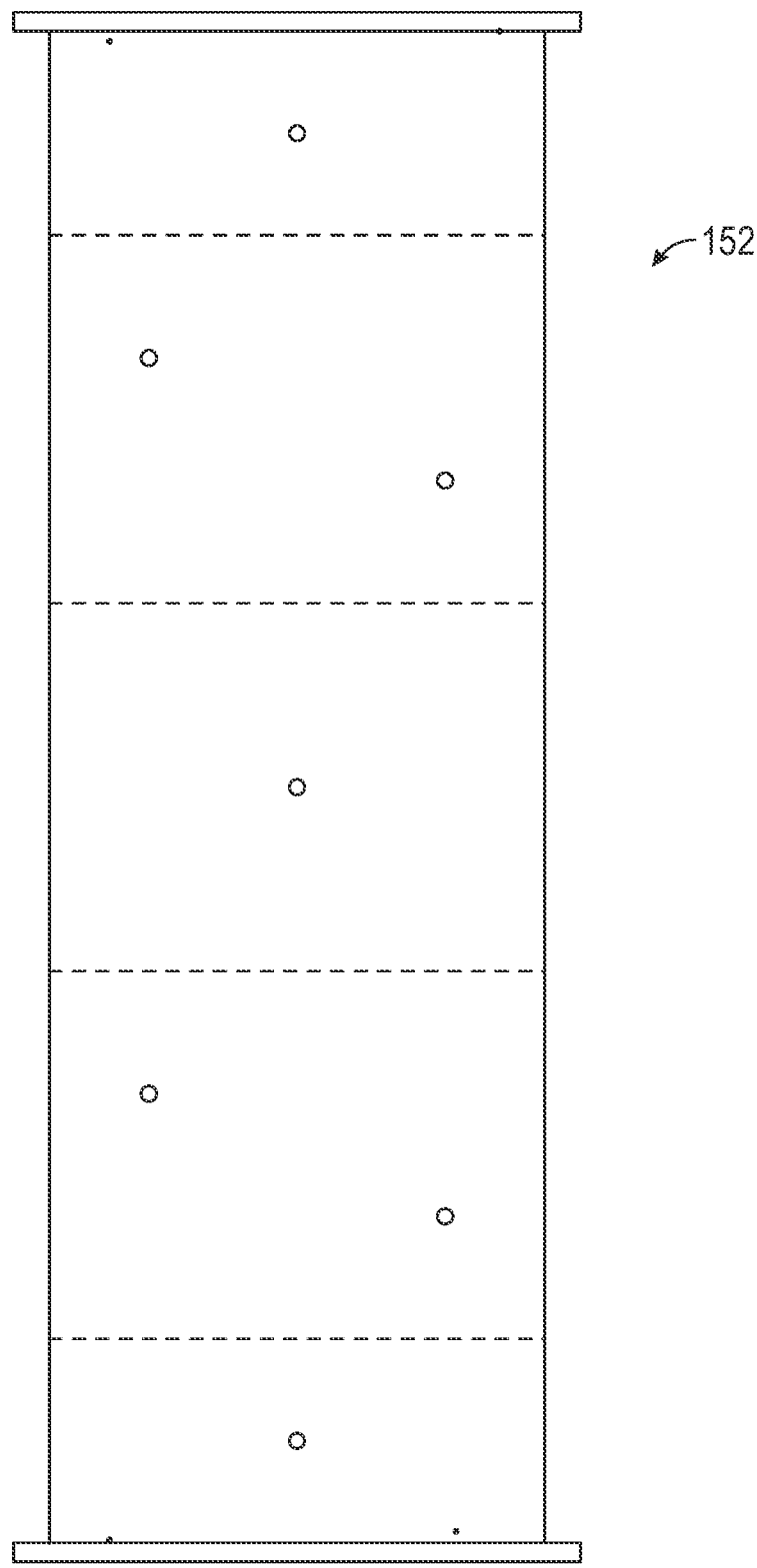
FIG. 8 is an elevation view of one of many embodiments of a seawater and brine mixing system for use with a desalination plant according to the disclosure.
Figure 9:
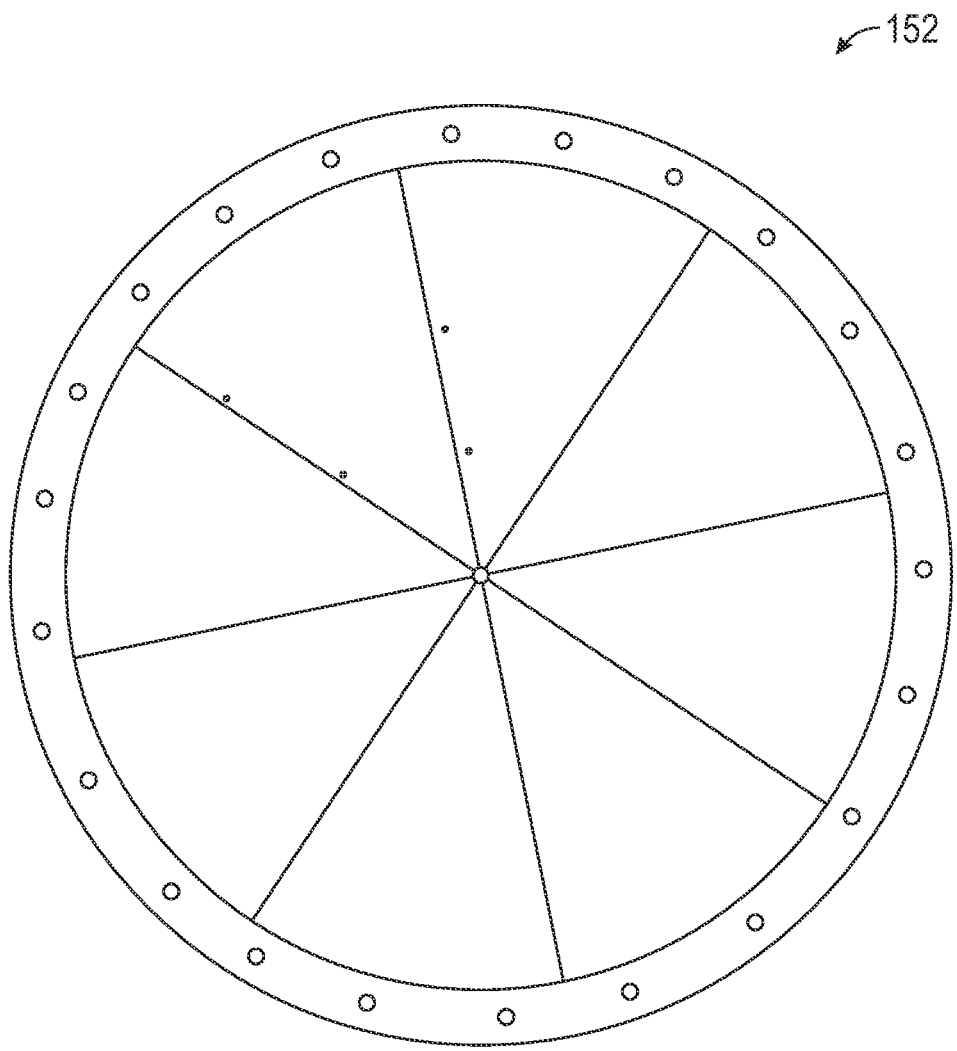
FIG. 9 is a plan view of the mixing system shown in FIG. 8.
Figure 10:
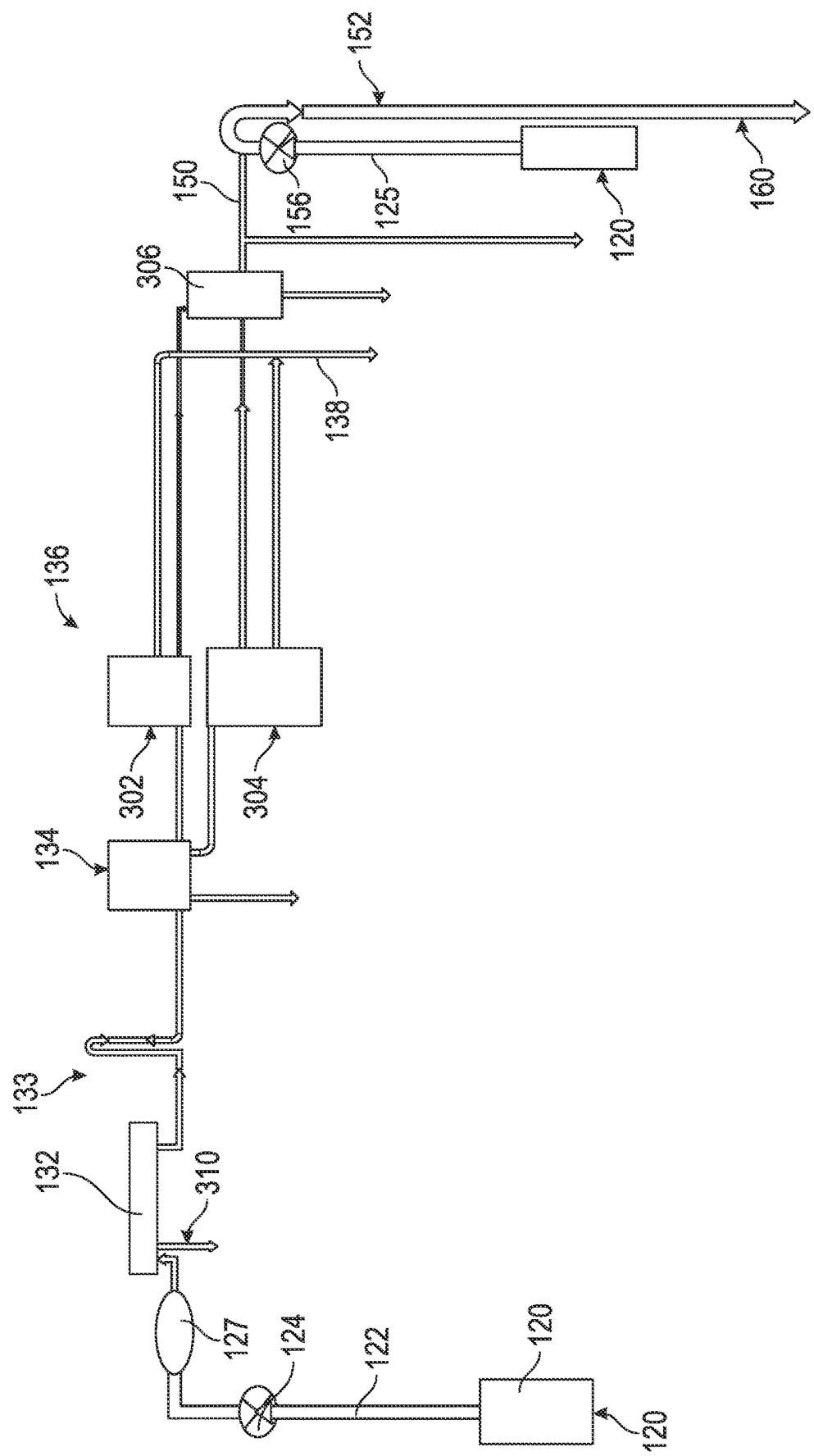
FIG. 10 is a process flow diagram of one of many embodiments of a desalination plant according to the disclosure.
Figure 11A:
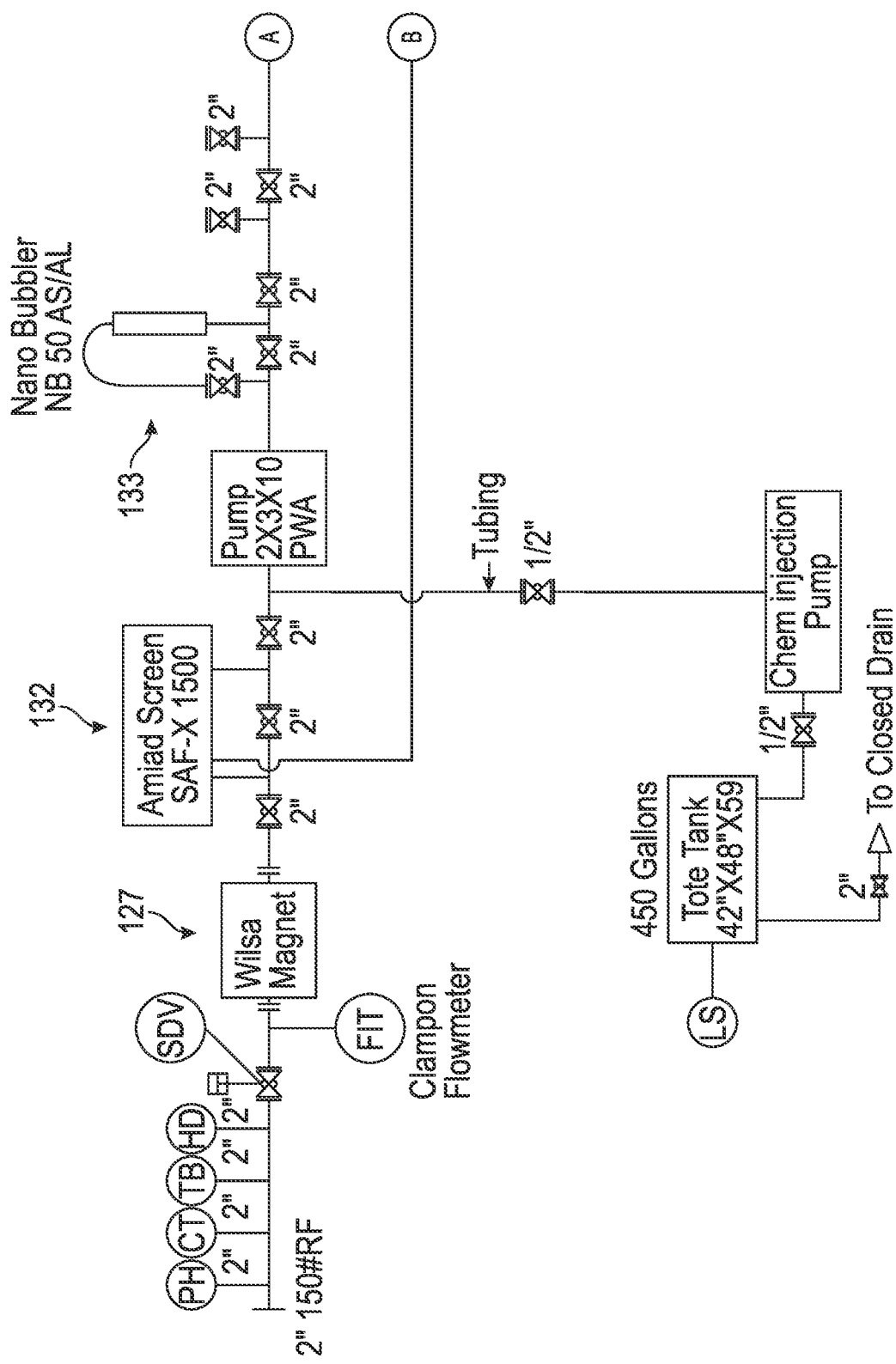
FIGS. 11A-11E are partial piping and instrumentation diagrams of one of many embodiments of a desalination plant according to the disclosure.
Figure 11B:
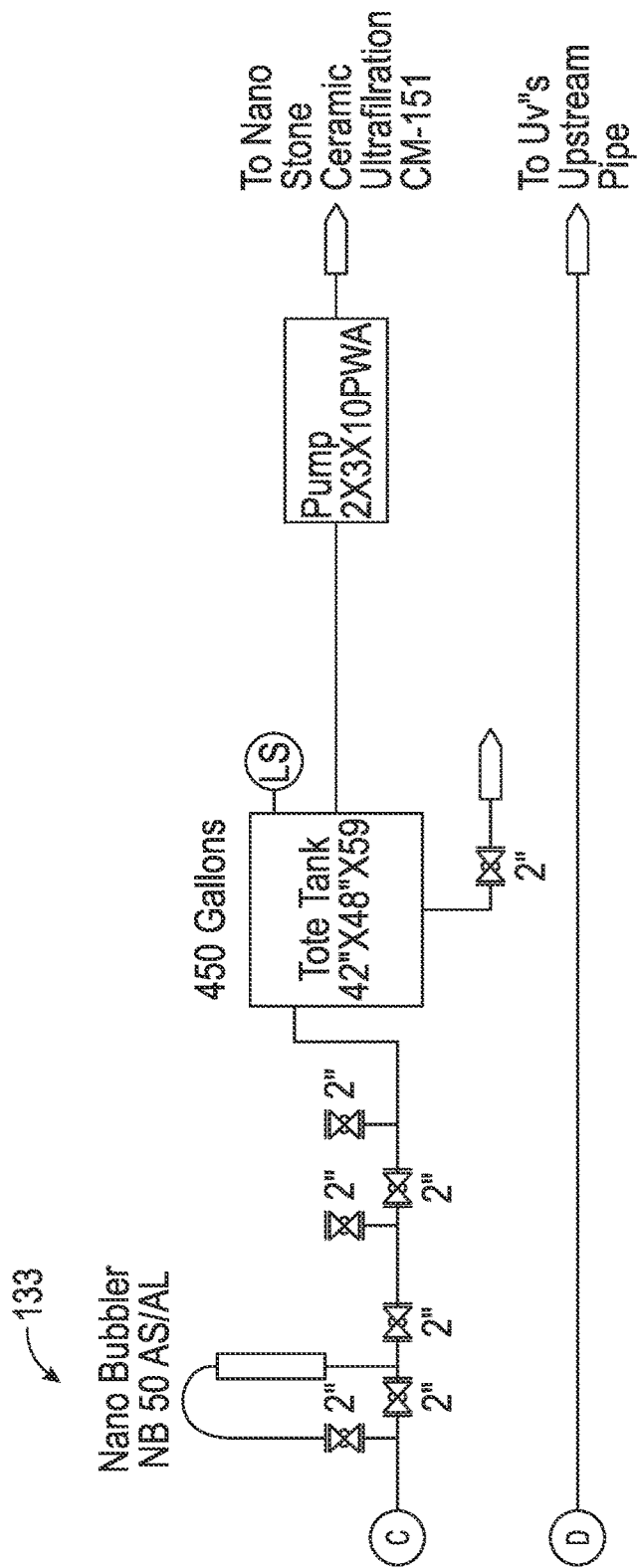
Figure 11C:
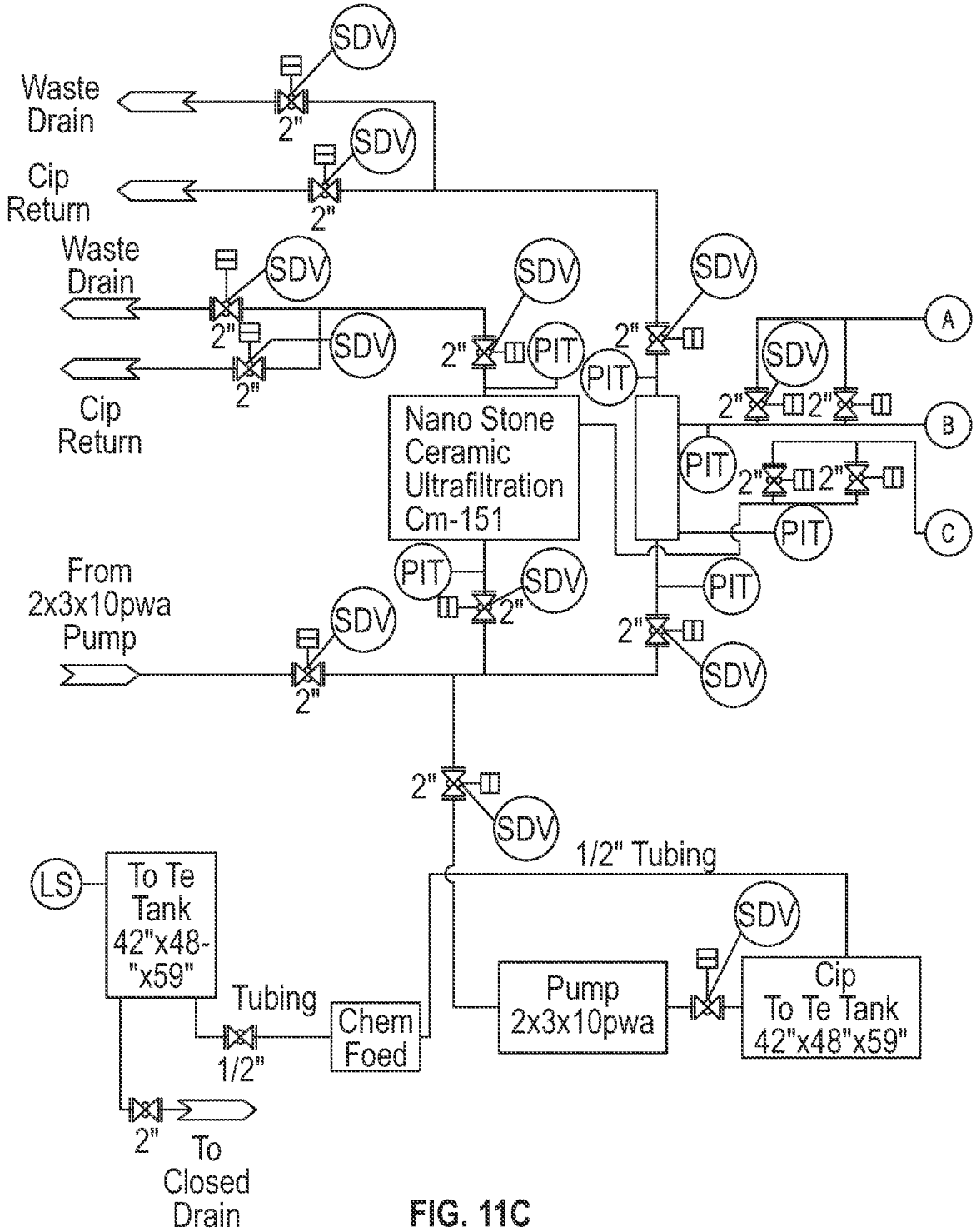
Figure 11D:
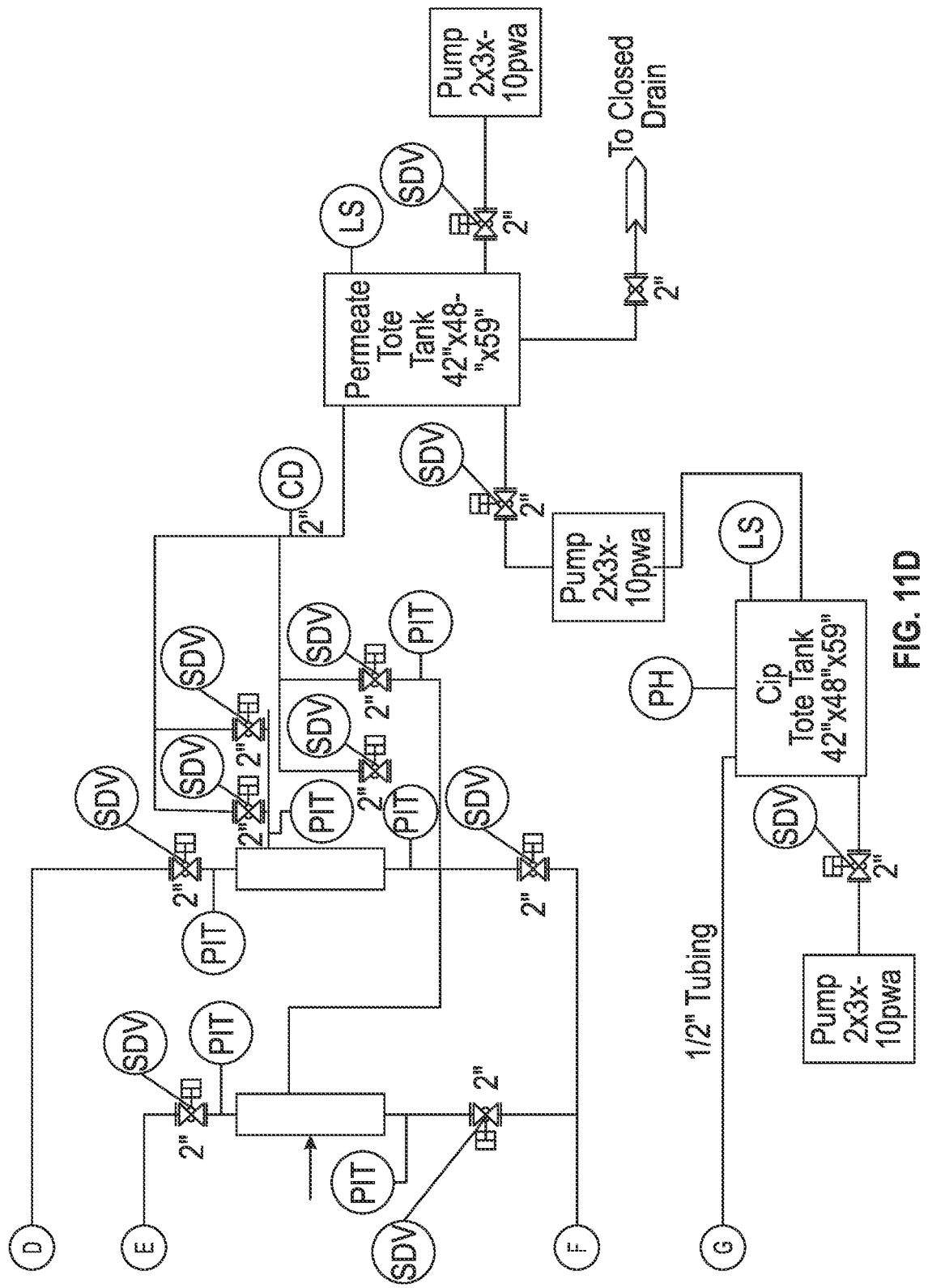
Figure 11E:
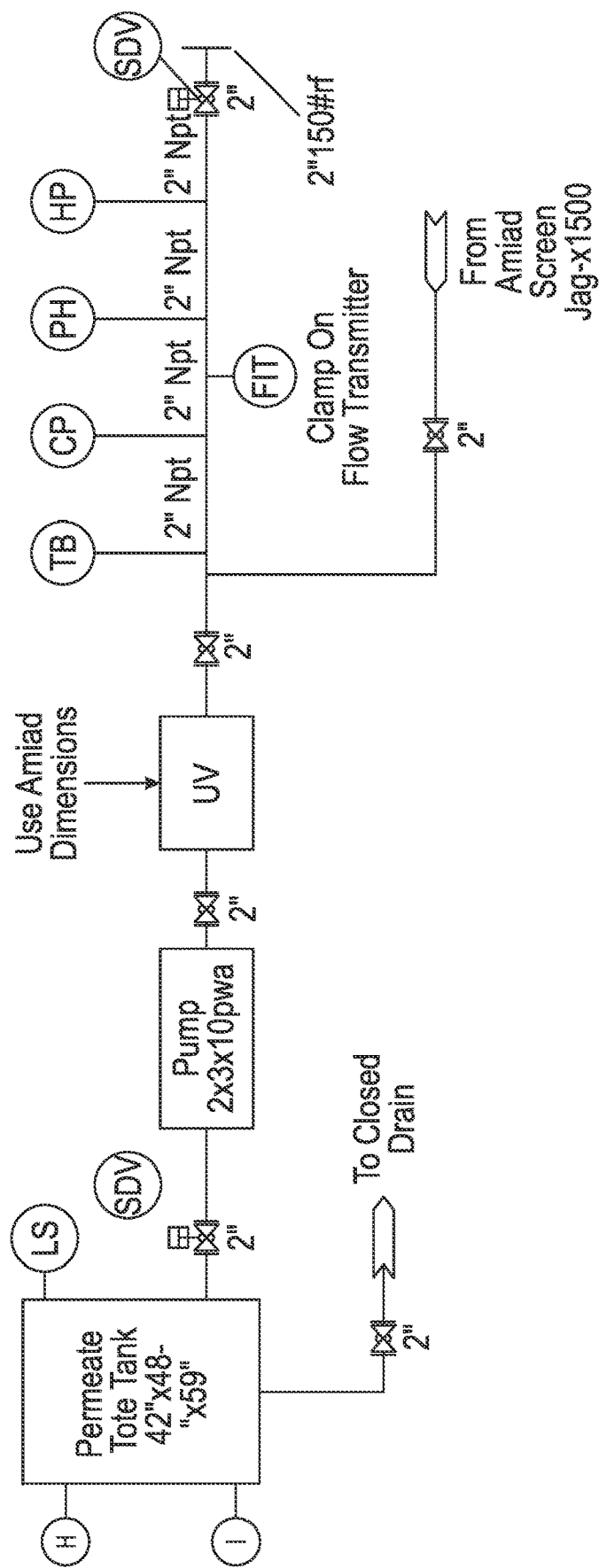
Figure 12:
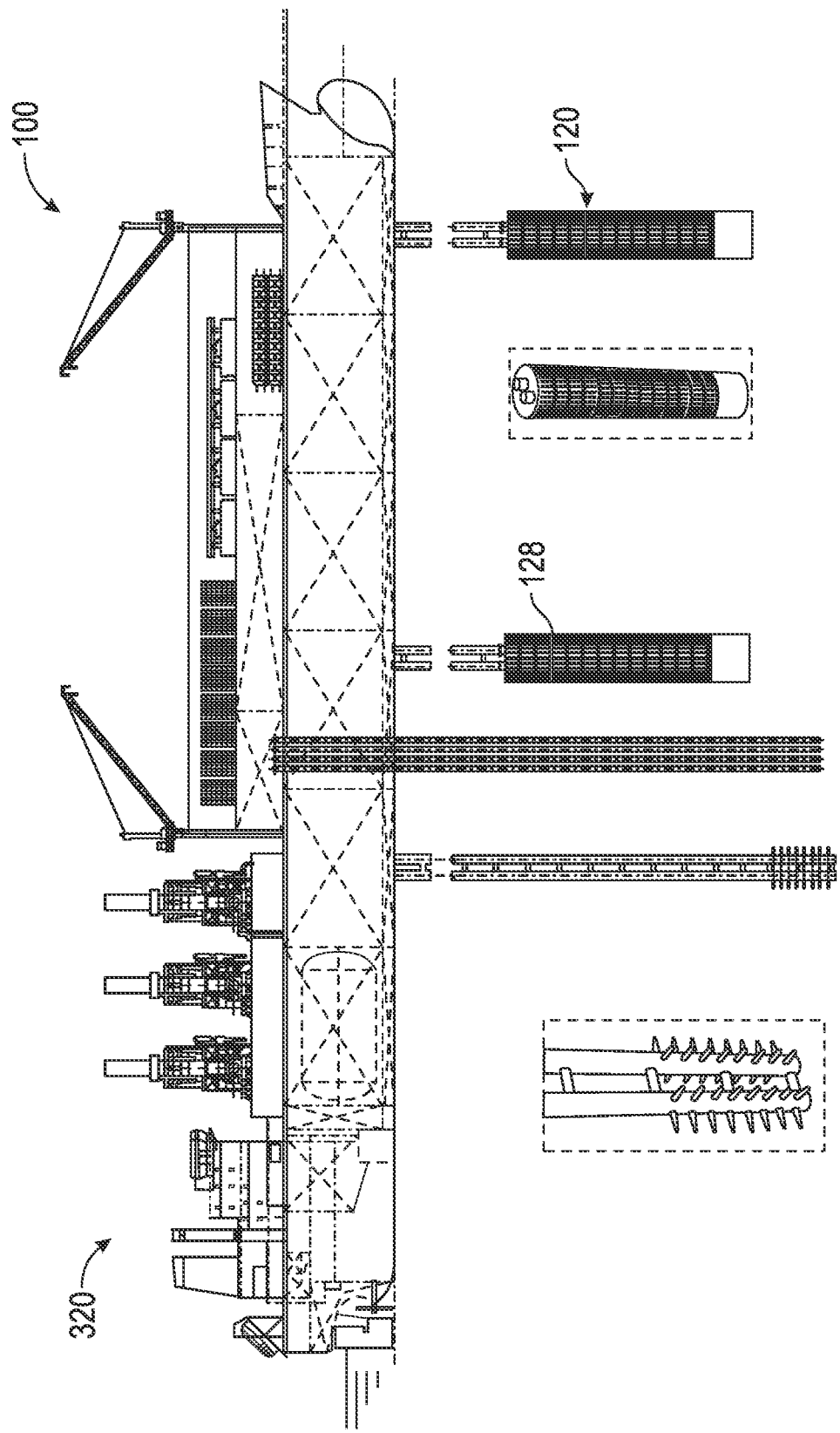
FIG. 12 is a side view of one of many embodiments of a desalination plant according to the disclosure.
Figure 13:
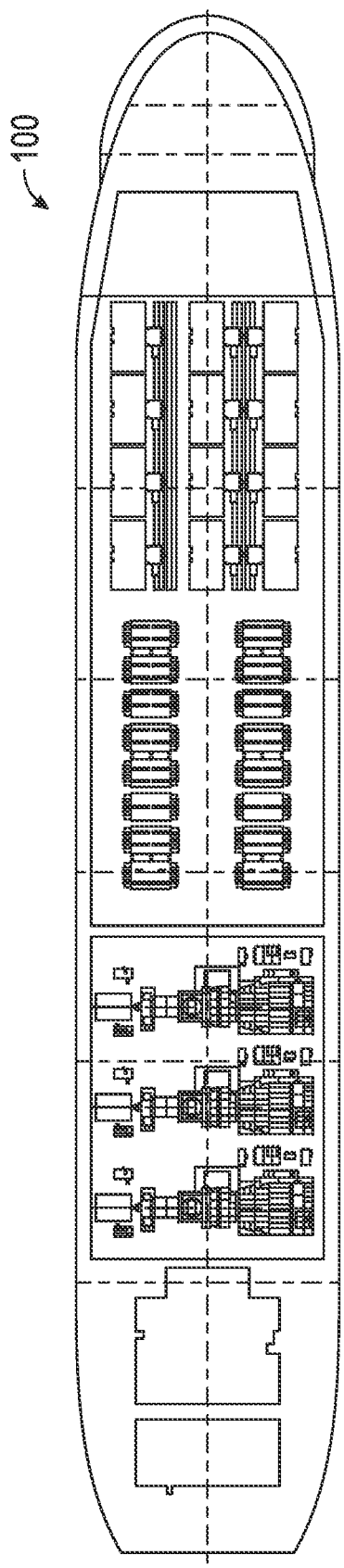
FIG. 13 is a top view of the platform level of the exemplary embodiment of FIG. 12.
Figure 14:
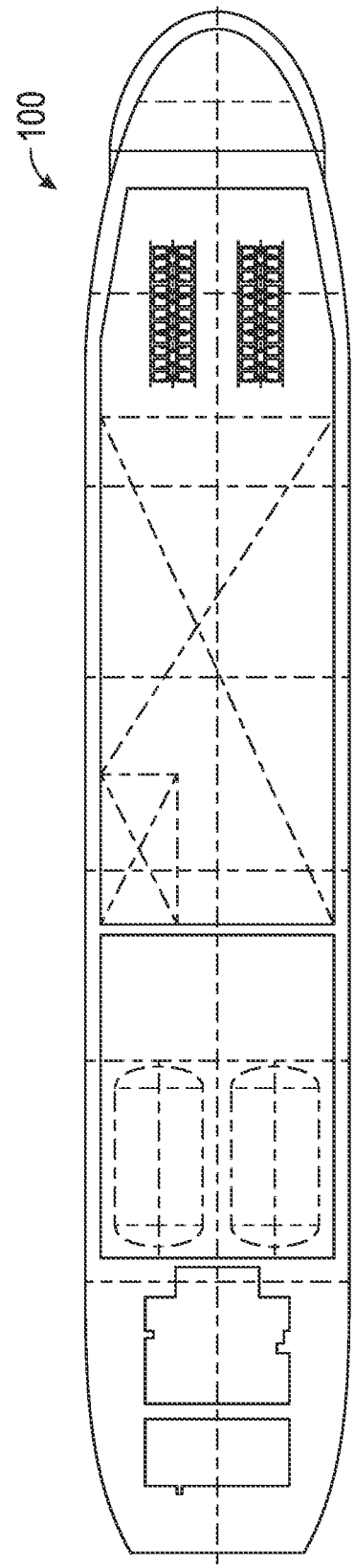
FIG. 14 is a top view of the main deck level of the exemplary embodiment of FIG. 12.

FIG. 1 is a schematic view of one of many embodiments of a desalination plant according to the disclosure. FIG. 2 is a plan view of one of many embodiments of one embodiment of a desalination plant according to the disclosure. FIG. 3 is a side view of one of many embodiments of one embodiment of a seawater intake system according to the disclosure. FIG. 4 is a side view of the desalination plant shown in FIG. 2. FIG. 5 is an elevation view of one of many embodiments of a seawater intake system for use with a desalination plant according to the disclosure. FIG. 6 is a perspective view of the seawater intake system shown in FIG. 5. FIG. 7 is a partial perspective view of the seawater intake system shown in FIG. 5. FIG. 8 is an elevation view of one of many embodiments of a seawater and brine mixing system for use with a desalination plant according to the disclosure. FIG. 9 is a plan view of the mixing system shown in FIG. 8. FIG. 10 is a process flow diagram of one of many embodiments of a desalination plant according to the disclosure. FIGS. 11A-11E are partial piping and instrumentation diagrams of one of many embodiments of a desalination plant according to the disclosure. FIG. 12 is a side view of one of many embodiments of a desalination plant according to the disclosure. FIG. 13 is a top view of the platform level of the exemplary embodiment of FIG. 12. FIG. 14 is a top view of the main deck level of the exemplary embodiment of FIG. 12. FIGS. 1-14 will be described in conjunction with one another.

In at least one embodiment, a desalination plant can include an apparatus and/or process for producing potable water from seawater and can include a subsurface discharge line for diluted heavy brine. In at least one embodiment, a desalination plant can include an apparatus and/or process for controlling the dilution of heavy brine discharged from a reverse osmosis (also referred to herein as RO) desalination plant with seawater and/or the subsea level at which the diluted heavy brine is dispersed into the ocean. In at least one embodiment, a desalination plant can also minimize the entrainment and death of large quantities of ocean life in the intake of large quantities of source seawater for the desalination plant and/or the localized discharge of large quantities of heavy brine into the environment.

In at least one embodiment, a desalination plant 100 can be or include an offshore desalination plant, such as that schematically shown in FIG. 1. In at least one embodiment, a desalination plant 100 can include a floating deck 110 that can be easily towed offshore that provides the space and stability needed to mount or support a large desalination plant. In at least one embodiment, a desalination plant can include a coarse filter unit 132, a fine filter unit 134, a reverse osmosis unit 136 and/or a fresh water line 138. In at least one embodiment, a desalination plant 100 can include a submerged seawater intake system having an intake filter 120, a seawater source line 122 routed to the desalination plant, and/or a diluent seawater line 125 that delivers seawater to dilute the heavy brine discharged from the desalination plant. In at least one embodiment, a desalination plant can include a heavy brine discharge system including a RO heavy brine discharge line 150 from the reverse osmosis unit that intersects the diluent seawater line 125, a mixing device 152 for mixing the heavy brine discharge and the seawater, and/or a discharge line 160, which can be at least partially submerged beneath a water surface 161.

In at least one embodiment, a desalination deck 110 can be manufactured and the desalination plant 100 can be installed on top of the deck in relatively shallow water. Once the deck and the desalination plant are ready the deck can be towed out to the selected location and deployed. The desalination deck 110 can be designed to operate in the ocean at 500 ft. to 10,000 ft. of water.

In at least one embodiment, the deck 110 can be a cross-leg platform with a ballast plate, such as seen in FIG. 2. In at least one embodiment, the deck structure 110 can be supported by multiple pairs of inclined buoyant legs 250 which in turn can support a subsurface damping plate structure 200 for reducing the motions of the platform. In at least one embodiment, major structural components of the deck can be joined by selectively operable pin connections.

In at least one embodiment, the deck section 110 can be suitable for supporting a desalination plant and/or can be positioned at the upper end of the structure. In at least one embodiment, the deck can be supported by multiple buoyant leg pairs 250. In at least one embodiment, the deck, such as that illustrated in FIG. 2, can be supported by three leg pairs. In at least one embodiment, selectively operable field mateable pin assemblies can be mounted in the upper and lower ends of each leg. The pin assemblies can be hydraulically extensible and/or retractable. The pin assemblies can interconnect the legs to the upper deck and/or the damper plate 200. In at least one embodiment, the damper plate 200 can interconnect the bottom end of the leg system to stabilize the deck.

In at least one embodiment, the desalination plant 100 can be mounted on the top surface of the desalination deck 110 and/or can include one or more stages. In at least one embodiment, the desalination plant 100 can include three stages. In at least one embodiment, the coarse filters 132 can have a pore size of between 80 and 100 microns. In at least one embodiment, the first stage can include a set of coarse filters 132, such as Amiad™ self-cleaning filters, which can have a pore size of, e.g., about 100 microns. In at least one embodiment, the coarse filters 132 can be a centrifuge filter type that spins the pumped water through a 100 micron filter. In at least one embodiment, the coarse filters 132 can remove sand, plankton, and any other residual sea life that was not excluded by the intake filter 120, 128. In at least one embodiment, the discharge from the coarse filters 132 can be directly fed back into the ocean, thereby increasing the survival rate of any marine life caught in the intake system.

In at least one embodiment, one or more nano-bubble injectors 133 can be positioned downstream of the coarse filters 132. In at least one embodiment, the nano-bubble injector 133 can break apart seawater molecules and/or kill bacteria. In at least one embodiment, an oxidizing agent can be injected, such as upstream of the nano-bubble injector 133, to aid in removal of iron.

In at least one embodiment, the second stage can include a set of fine filter units 134, such as the ultrafiltration units manufactured by Evoqua™. In at least one embodiment, the fine filter units 134 can comprise ceramic ultrafiltration filters. least one embodiment, the fine filter units 134 can comprise membranes having a pore size of 10 microns or less and/or can remove all bacteria and microorganisms from the filtered seawater sent to the reverse osmosis stage. In at least one embodiment, the discharge from the fine filter units 134 can be directly fed back into the ocean. In at least one embodiment, the seawater retained by the fine filter units 134 can be injected into the seawater diluent line 125.

In at least one embodiment, the desalination reverse osmosis phase of the desalination plant can utilize one or more reverse osmosis units 136 and/or electro dialysis units 302. In at least one embodiment, the desalination plant can utilize a combination of two or more container frame skid designs, with one skid design containing multiple reverse osmosis membranes and another skid design containing the pumps and/or the electrical units for running the reverse osmosis membranes. In at least one embodiment, one pump skid can service two membrane skids. Such container skid designs can be easily stacked and/or easily exchanged for maintenance. In at least one embodiment, the skids can be coupled with high pressure couplings. In at least one embodiment, the brine discharge from the reverse osmosis units 136 can be injected into the same seawater diluent line as the ultra-filtration units 134.

In at least one embodiment, seawater can be pumped from the ocean via the seawater intake system. In at least one embodiment, the seawater intake system can include one or more intake filters 120 and/or 128, one or more seawater source lines 122 routed to the desalination plant, one or more diluent seawater lines 125 that deliver seawater to dilute the heavy brine discharged from the desalination plant, and/or a pump barge 126.

In at least one embodiment, the intake filter 120 can exclude marine life and/or other large objects. In at least one embodiment, the intake filter 120 can be sized to minimize suction pressure at any one point, such as to prevent marine life becoming trapped, and still accommodate high seawater flow rates. In at least one embodiment, the intake filter 120 can be positioned within 100 feet of the seabed. In at least one embodiment, the intake filter 120 can be over 100 feet tall and over 25 feet in diameter. In at least one embodiment, the intake filter 120 can be about 140 feet tall and about 30 feet in diameter. In at least one embodiment, the intake filter 120, such as that shown in FIG. 2, can measure about 125×125×350 feet and/or can be supported by large floatation tubes 121. In at least one embodiment, the intake filter 120 can be towed to the selected location and can be submerged in the ocean by filling the floatation tubes. Once the filter 120 is submerged to a depth sufficient to allow the pump barge 126 to be towed in above the intake filter 120, the pump barged can be towed into place and secured to the intake filter 120 by cross cables 123. In at least one embodiment, the intake filter can then be submerged to its proper operating depth and the cables 123 can be tightened thereby securing the filter to the pump barge. In at least one embodiment, the pump barge 126 can be held stationary by tensioners 130 attached to screw anchors in the ocean floor thereby securing the intake system. In at least one embodiment, the intake filter 120 can weigh between 100 and 1000 tons. In at least one embodiment, the intake filter 120 can be secured using explosive bolts, such that the intake filter 120 can be jettisoned in the case of an emergency.

In at least one embodiment, the intake filter 120 can be one single large filter unit 120 surrounding the intake ends of multiple intake lines (both seawater source lines 122 and seawater diluent lines 125). In at least one embodiment, the intake filter 120 can be positioned within 100 feet of the seabed. In at least one embodiment, the intake filter 120 can be submerged to an operation depth of 400 ft or greater. At this depth in the ocean there is very little light or ultraviolet penetration ensuring that the intake system minimizes the aquatic life entrained in the seawater taken up into the intake lines. In at least one embodiment, seawater can be drawn through the intake filter 120, and up to the stages of the desalination plant 100 using one or more pumps 124.

In at least one embodiment, the intake filter 120 has an outer screen 129 mounted on the outside of the filter device. In at least one embodiment, the outer screen 129 can have a pore size of 10 mm or less to exclude any marine life larger than 10 mm from being pumped into the intake lines. Smaller intake filters 128 can be selectively mounted on the seawater intake ends of one or more intake lines. When the large intake filter 120 is used without the smaller intake filters 128 or the smaller intake filters 128 are used on the individual intake lines, the intake filters 120 or 128 can have an outer screen 129 having a pore size of 5.0 mm or less with a pore size that typically ranges from 2.5-4.0 mm. In at least one embodiment, the filter screen 129 can be stainless steel and/or coated with an epoxy or composite material to reduce the accumulation of sea life buildup (e.g., barnacles). In at least one embodiment, the outer filter screen 129 can be flat on all sides so that the screen can be periodically high pressure washed. In at least one embodiment, the intake filter 120 can include a series of back pressure ports to assist in cleaning the screen.

In at least one embodiment, the pump barge 126 can have multiple intake lines extending from the barge into the intake filter 120. The seawater can be pumped through the multiple intake lines using a suction pump 124 mounted on the pump barge 126 for each intake line. In at least one embodiment, the intake system can have ten intake lines, five seawater source lines 122 and/or five seawater diluent lines 125. In at least one embodiment, the seawater can be pumped up through the intake filter 120 and into the intake lines by the pumps 124. In at least one embodiment, the intake pump barge 126 can have a number of high turbine rotary pumps 124 mounted on it, with one or more pumps per intake line. In at least one embodiment, the pumps can provide the filtered water from the seawater source lines 122 to the desalination plant 100 on the deck 110 and/or the filtered water from the seawater diluent lines 125 to mix with the heavy brine discharge of the desalination plant. In at least one embodiment, the pumps 124 can be connected to the desalination plant and/or the heavy brine discharge lines with coflex hoses. In at least one embodiment, the pump barge 126 can have one or more cranes mounted on the barge to service the pumps 124 and/or the tensioners 130. In at least one embodiment, the suction pump, or pumps, 124 can be between 6,000 and 9,000 horsepower, collectively or individually.

In at least one embodiment, one or more magnetic fields can be positioned downstream of one or more pumps 124. In at least one embodiment, one or more magnetic fields can be positioned upstream of one or more pumps 124. In at least one embodiment, one or more magnetic fields can be provided by one or more electromagnets 127. Such magnetic fields can align and/or elongate the water molecules to make their walls or bonds thinner and/or weaker as the water passes one or more times there through. In at least one embodiment, one or more electromagnets 127 can be or include a high-intensity electromagnet, which can be particularly advantageous in the context of the present disclosure. For example, in at least some implementations, magnets such as rare-earth magnets or other permanent magnets may not produce a magnetic field strong enough to meet the goals of the present disclosure. Consequently, one or more high-intensity electromagnets 127 can be utilized to sufficiently treat the water molecules upstream of one of or more other system components (e.g., screen 132, nano-bubble injector 133 and/or ultra-filtration unit 134) in order to enable or improve the performance or effectiveness of such downstream treatment of the molecules.

In at least one embodiment, the fresh water discharge system can include a fresh water barge 140 and/or a fresh water storage tank 142 connected to the fresh water outlet of the reverse osmosis units 136 by one or more fresh water outlet lines 138. In at least one embodiment, each reverse osmosis unit 136 can have a fresh water outlet line that can flow directly into the storage tank 142 or can be connected to a centralized fresh water outlet line that consolidates the fresh water output from all of the reverse osmosis units.

In at least one embodiment, fresh water storage tank 142 can be at least large enough to store all of the fresh water produced within several hours of the desalination plant operation. In at least one embodiment, the fresh water produced by the desalination plant can be pumped through the fresh water outlet line(s) 138 into the fresh water storage tank 142 via high pressure coflex hoses. In at least one embodiment, the fresh water barge 140 can have a number of high turbine rotary pumps 124 mounted on it, with at least one pump per fresh water outlet line 138. In at least one embodiment, the pumps 124 can pump the fresh water from the storage tank 142 to shore via the fresh water pipelines 170. In at least one embodiment, the fresh water barge 140 can have one or more cranes mounted on the barge to service the pumps 124 and/or the tensioners 130 that tether the barge to the ocean floor. In at least one embodiment, the fresh water produced by the desalination plant can be pumped through the fresh water outlet line(s) 138 to shore, such as for immediate use. In at least one embodiment, the fresh water outlet line(s) 138 to shore or the fresh water pipelines 170 can be up to 48 inches in diameter and up to 40 miles long. Smaller pumps and/or lines can be used where shorter lines are used. Similarly, larger pumps and/or lines can be used where longer lines are used.

In at least one embodiment, the heavy brine discharge system can include a diluent seawater line 125 and one or more heavy brine lines 150 from the reverse osmosis units that are in fluid communication with the seawater in the diluent seawater line 125. In at least one embodiment, the heavy brine from the reverse osmosis units can be diluted with the filtered seawater from the diluent seawater line 125 and/or can enter a diluted heavy brine discharge line 160 where the diluted heavy brine may optionally pass through one or more static mixers 152, one or more accelerators 154, one or more pumps 156, one or more generators 158, or any combination thereof, before being discharged into the ocean.

In at least one embodiment, the diluted heavy brine discharge line 160 can include a network of discharge lines spread outwardly from the main diluted heavy brine discharge line 160. In at least one embodiment, the network of discharge lines may further include a plurality of spaced apart dispersant units 165. In at least one embodiment, the pump 156 can be between 6,000 and 9,000 horsepower, collectively or individually, and/or can be controlled through one or more variable frequency drives. In at least one embodiment, the one or more static mixers 152, one or more accelerators 154, one or more pumps 156, one or more generators 158, or any combination thereof, can be used to create a vortex to further mix or dilute the brine with the seawater before exiting the discharge line 160. Because most marine life is expected to be shallower than around 450 feet, such as due to sunlight penetration, and the discharge line 160 can extend below 500 feet deep, in some embodiments, the survival rate of marine life can be very high, such as about 93% or above, even at high fresh water production rates (and thus high brine discharge rates).

In at least one embodiment, the heavy brine discharge system begins at the seawater intake system where seawater is pumped through the intake filter 120 into the seawater diluent line 125. In at least one embodiment, the seawater diluent line 125 can traverse the underside of the desalination deck 110 where it can intersect with the heavy brine lines 150 from the reverse osmosis units 136 and the remainder seawater from the ultra-filtration unit 134. In at least one embodiment, the filtered seawater can be pumped through the seawater diluent line under the deck where the reverse osmosis desalination units are mounted. In at least one embodiment, the heavy brine discharge from the reverse osmosis units can be pumped through heavy brine lines 150 to mix with the filtered seawater being pumped through the seawater diluent line 125. In at least one embodiment, the flow rate of the filtered seawater flowing through the seawater diluent line can be adjusted to provide sufficient seawater to dilute the heavy brine discharge to a predetermined desired salinity before being discharged back into the ocean.

In at least one embodiment, when the seawater diluent line 125 reaches the end of the desalination deck 110 it can drop downwardly into the diluted heavy brine discharge line 160. In at least one embodiment, the upper portion of the diluted heavy brine discharge line 160 can selectively contain a static mixer 152, an accelerator 154, a hydro driven generator 158, or any combination thereof. In at least one embodiment, a suitable static mixer can include one or more sets of square bars set at right angles within the heavy brine discharge line. The rapidly flowing diluted heavy brine discharge can encounter the square bars set at right angles, which can create fluid vortexes on the back sides of the right angled bars to ensure the thorough mixing of the heavy brine discharge with the diluent seawater. In at least one embodiment, after passing through the static mixer, the diluted heavy brine can then pass through an accelerator 154, such as metal vanes welded in a clockwise twist within the accelerator. As the diluted heavy brine passes through the accelerator the speed of the flowing diluted heavy brine will increase. This rapidly flowing diluted heavy brine can then be pumped through a hydro driven generator 158 to generate power to feed back to the desalination plant.

In at least one embodiment, the diluted heavy brine discharge line 160 can continue downwardly to a depth of 400 ft or more. Minimal marine life resides at 400 ft or more because of the low light penetration, therefore the discharge of the diluted heavy brine at that depth can have a lessened environmental impact on marine life. In at least one embodiment, once the heavy brine discharge line 160 has reached the desired depth, an optional network of discharge lines can radiate from the main discharge line 160. In at least one embodiment, each discharge line in this network of radiating discharge lines can incorporate a number of spaced apart dispersant units or rosettes 165. In at least one embodiment, the diluted heavy brine pumped through this dispersal system can be further diluted by the ocean as it is being discharged. At this point the heavy brine can be diluted sufficiently to minimize any danger to the marine life of that area.

In at least one embodiment, the discharge from any of the filters can be direct into the surface water supplying nutrients for the fish located in this part of the water column. In at least one embodiment, the discharge from any of the filters can be mined for metals and/or minerals as the filtration will remove these from the feed stream.

In at least one embodiment, a multi-point mooring system can be used to hold the desalination plant in place. For example, a twelve-point mooring system can be used to hold the desalination plant in place. In at least one embodiment, thrusters can be attached to the desalination plant and powered by the power house in addition to, or instead of, the mooring system.

In at least one embodiment, a desalination plant can include other processes to produce potable fresh water from seawater. For example, the desalination plant can include an electro-dialysis process 302, a distillation process 304, and/or a lithium extraction process 306. In at least one embodiment, brine discharge lines from the reverse osmosis 136, the electro-dialysis 302, the distillation 304 can be fed through the lithium extraction process 306, extracting lithium concentrate therefrom, before being discharged, such as through the brine lines 150 and/or mixer 152.

In at least one embodiment, a method of producing potable fresh water can include drawing seawater through at least one marine life extractor 120, which can be positioned at least 400 feet below a surface of a body of seawater. In at least one embodiment, the marine life extractor 120 can be positioned at least 100 feet above a seabed of the body of seawater. For example, the marine life extractor 120 can be positioned at least 400 feet below the surface of the body of seawater and positioned at least 100 feet above the seabed of the body of seawater. In at least one embodiment, the intake filter and/or marine life extractor 120 can be positioned at least 500 feet deep. In at least one embodiment, a method of producing potable fresh water can include pumping at least some of the seawater through at least one filter 132, 134 creating filtered seawater.

In at least one embodiment, a method of producing potable fresh water can include pumping the filtered seawater through at least one desalination device creating fresh water and brine. In at least one embodiment, the desalination device can include a reverse osmosis device 136. In at least one embodiment, the desalination device can include a distillation device 304. In at least one embodiment, the desalination device can include an electro-dialysis device 302. In at least one embodiment, the desalination device can include a lithium extraction device 306.

In at least one embodiment, a method of producing potable fresh water can include mixing the brine with at least some of the seawater creating diluted brine. In at least one embodiment, effluent captured in filter 132, 134 can be mixed with the brine before discharging the diluted brine.

In at least one embodiment, a method of producing potable fresh water can include discharging the diluted brine at least 400 feet below the surface of the body of seawater. In at least one embodiment, the diluted brine can be discharged at least 100 feet above a seabed of the body of seawater. For example, diluted brine can be discharged at least 400 feet below the surface of the body of seawater and at least 100 feet above a seabed of the body of seawater.

In at least one embodiment, effluent captured in filter 132, 134 can be discharged within 100 feet of the surface of the body of seawater. In at least one embodiment, one or more minerals can be mined from effluent captured in the at least one filter 132, 134.

In at least one embodiment, a desalination plant 100 can include one or more marine life extractors 120, which can be positioned at least 400 feet below a surface of a body of seawater and/or at least 100 feet above a seabed of the body of seawater.

In at least one embodiment, a desalination plant 100 can include a pump 124 configured to draw seawater through the marine life extractor 120. In at least one embodiment, a desalination plant 100 can include one or more filters 132, 134 configured to extract filtered seawater and effluent from the seawater.

In at least one embodiment, a desalination plant 100 can include one or more desalination devices configured to extract fresh water and/or brine from the filtered seawater. In at least one embodiment, the desalination device can include a reverse osmosis device 136. In at least one embodiment, the desalination device can include an electro-dialysis device 302. In at least one embodiment, the desalination device can include a distillation device 304. In at least one embodiment, the desalination device can include a lithium extraction device 306. In at least one embodiment, the distillation device 304 can comprise power generation equipment for the desalination plant 100. In at least one embodiment, the distillation device 304 can comprise power generation equipment supplying between 240 and 350 megawatts to power the desalination plant 100. For example, one or more turbine power generators 320, such as those available from Siemens, can power the desalination plant 100 and thereby produce heat to be used in the distillation device 304.

In at least one embodiment, a desalination plant 100 can include a mixing device 152 configured to mix the brine with at least some of the seawater creating diluted brine. In at least one embodiment, mixing device 152 can also be configured to mix effluent captured in the at least one filter 132, 134 with the brine.

In at least one embodiment, a desalination plant 100 can include a discharge pipe 160 configured to discharge the diluted brine at least 400 feet below the surface of the body of seawater and/or at least 100 feet above a seabed of the body of seawater.

In at least one embodiment, a desalination plant 100 can include an effluent pipe 310 configured to discharge effluent captured in the filter within 100 feet of the surface of the body of seawater. In at least one embodiment, a desalination plant can include an extraction device for extracting one or more minerals from effluent captured in the filter.

As noted above and illustrated, for example, in FIGS. 12-14, in at least one embodiment, desalination plant 100 can be or include one or more floating vessels, such as a ship or barge, which can be self-propelled or otherwise propelled as needed or desired in accordance with an implementation of the disclosure. Alternatively, or collectively, desalination plant 100 can be or include one or more support structures, such as a platform or frame, physically supported by the earth, whether by a seabed, dry land, or both. Further, the exemplary configurations shown in the figures are for illustrative purposes and do not show every possible configuration of the components of plant 100. Rather, any of the components disclosed herein can be arranged and configured in any manner on one or more vessels or other support structures, as needed or desired in accordance with an implementation of the disclosure.

As will be appreciated by one of ordinary skill in the art having the benefits of the present disclosure, aspects of the embodiments can be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present disclosure can be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure can be and/or are described with reference to flowchart illustrations and/or block diagrams of methods, apparatus (systems) and computer program products according to embodiments of the disclosure. Each block of a flowchart illustration and/or block diagram, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer readable medium (which can be or include any non-transitory computer readable media) that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other device(s) to produce a computer implemented process such that the instructions which execute on the computer or other programmable apparatus provide processes for implementing the functions/acts specified in a flowchart and/or block diagram block or blocks.

In at least one embodiment, a system, such as a system for cleaning or treating water, can include an intake configured to receive input water, a pump configured to move the input water through at least a portion of the system, a discharge for discharging output water, an electromagnet configured to expose the input water to a magnetic field fluidically between the intake and the discharge, a course filter unit configured to filter the input water fluidically between the intake and the discharge, a nano-bubble injector configured to inject nanobubbles into the input water fluidically between the intake and the discharge, and an ultrafiltration filter configured to filter the input water fluidically between the intake and the discharge. In at least one embodiment, a system for cleaning water can be or include a system for producing potable fresh water from seawater, such as a desalination plant.

In at least one embodiment, the magnetic field can be upstream of the course filter unit, and the course filter unit can be upstream of the nano-bubble injector. In at least one embodiment, the nano-bubble injector can be upstream of the ceramic ultrafiltration filter. In at least one embodiment, the pump can be upstream of the magnetic field. In at least one embodiment, the pump can be downstream of the magnetic field. In at least one embodiment, a system can include at least one of a reverse osmosis device, a distillation device, an electro-dialysis device, a lithium extraction device, a thermal distillation device, and a combination thereof, plumbed fluidically between the ceramic ultrafiltration filter and the discharge. In at least one embodiment, a system can include a reverse osmosis device plumbed fluidically between the ceramic ultrafiltration filter and the discharge, and a lithium extraction device plumbed fluidically between the reverse osmosis device and the discharge.

In at least one embodiment, a system can include at least one marine life extractor upstream of the pump. In at least one embodiment, the at least one marine life extractor can be configured to be coupled to the intake and disposed at least 400 feet below a surface of a body of seawater. In at least one embodiment, a system can include at least one desalination device downstream of the ceramic ultrafiltration filter, wherein the at least one desalination device can be configured to extract fresh water and brine from seawater, such as filtered seawater.

In at least one embodiment, a system can include a mixing device downstream of the at least one desalination device, wherein the mixing device can be configured to mix the brine with seawater to create a diluted brine. In at least one embodiment, a system can include a discharge pipe downstream of the mixing device, and the discharge pipe can be configured to discharge the diluted brine below the surface of a body of seawater. In at least one embodiment, the discharge pipe can be configured to discharge the diluted brine at least 400 feet below the surface of the body of seawater. In at least one embodiment, the at least one marine life extractor can be configured to be disposed at least 100 feet above a seabed of the body of seawater. In at least one embodiment, the discharge pipe can be configured to discharge the diluted brine at least 100 feet above a seabed of the body of seawater.

In at least one embodiment, at least one of a course filter unit and an ultrafiltration filter (or filter unit) can be configured to extract effluent from the input water, and a system can include an extraction device downstream of the ultrafiltration filter. In at least one embodiment, the extraction device can be configured to extract one or more minerals from the effluent. In at least one embodiment, a system can include one or more effluent pipes configured to discharge the effluent, which can include discharge beneath the surface of a body of water. In at least one embodiment, at least one of a course filter unit and an ultrafiltration filter can be configured to extract effluent from the input water. In at least one embodiment, a system can include a mixing device downstream of an ultrafiltration filter, and the mixing device can be configured to mix the effluent with at least one liquid. In at least one embodiment, a mixing device can be configured to mix the effluent with brine extracted from seawater. In at least one embodiment, a diluent input line can be fluidically coupled to the mixing device, and the mixing device can be configured to mix the effluent with a diluent. In at least one embodiment, one or more diluent input lines can be configured to route seawater to a mixing device, such as via a pump and intake.

In at least one embodiment, a method can include moving input water into an intake, such as via one or more pumps, exposing the input water to a magnetic field created by one or more electromagnets for aligning, elongating or weakening one or more molecules, routing the input water through one or more course filters, routing the input water through a nano-bubble injector, injecting nanobubbles into the input water, routing the input water through a second, finer filter, such as a ceramic or other ultrafiltration filter, and routing output water to a discharge.

In at least one embodiment, a method can include exposing the input water to a magnetic field upstream of a course filter unit, and routing the input water through one or more course filters upstream of the nano-bubble injector. In at least one embodiment, a method can include routing the input water through a nano-bubble injector and injecting nanobubbles into the input water upstream of the ceramic ultrafiltration filter. In at least one embodiment, a method can include routing input water through at least one desalination device. In at least one embodiment, a method can include routing input water through at least one of a reverse osmosis device, a distillation device, an electro-dialysis device, a lithium extraction device, a thermal distillation device, and a combination thereof, such as downstream of a ceramic ultrafiltration filter. In at least one embodiment, a method can include routing input water through a reverse osmosis device downstream of an ultrafiltration filter. In at least one embodiment, a method can include routing input water through a lithium extraction device downstream of an ultrafiltration filter. In at least one embodiment, a method can include routing input water through a lithium extraction device downstream of a reverse osmosis device.

In at least one embodiment, a method can include routing input water through at least one marine life extractor upstream of a pump. In at least one embodiment, a method can include routing input water through at least one marine life extractor disposed at least 400 feet below a surface of a body of seawater. In at least one embodiment, a method can include extracting fresh water and brine from filtered seawater. In at least one embodiment, a method can include routing input water (including any component thereof) to a mixing device. In at least one embodiment, a method can include mixing brine with seawater to create a diluted brine. In at least one embodiment, a method can include discharging the diluted brine below the surface of a body of seawater. In at least one embodiment, a method can include discharging the diluted brine at least 400 feet below the surface of a body of seawater. In at least one embodiment, a method can include suspending or otherwise disposing at least one marine life extractor at least 100 feet above a seabed of a body of seawater. In at least one embodiment, a method can include discharging diluted brine at least 100 feet above a seabed of a body of seawater.

In at least one embodiment, a method can include extracting effluent from input water, such as downstream of an ultrafiltration filter, and extracting one or more minerals from the effluent with an extraction device. In at least one embodiment, a method can include discharging effluent beneath the surface of a body of water. In at least one embodiment, a method can include extracting effluent from input water, such as downstream of an ultrafiltration filter, and mixing the effluent with at least one liquid. In at least one embodiment, a method can include extracting effluent from input water, such as downstream of an ultrafiltration filter, and mixing the effluent with brine extracted from seawater. In at least one embodiment, a method can include mixing an effluent with a diluent, such as by pumping seawater or another diluent into a mixing device.

In at least one embodiment, a water treatment system, such as a desalination plant, can include an apparatus and/or a process for producing potable water from seawater. In at least one embodiment, a system can be disposed offshore and can include a subsurface discharge line for diluted heavy brine. In at least one embodiment, a system can include an apparatus and/or process for controlling the dilution of heavy brine, such as that discharged from a reverse osmosis desalination plant, with seawater and/or the subsea level at which the diluted heavy brine is dispersed into the ocean. In at least one embodiment, a system can be configured to operate offshore and/or pump potable water ashore. In at least one embodiment, a system can be configured to operate onshore and/or in cooperation with a body of liquid other than the ocean, such as a lake, stream, pond, holding tank, or another liquid source.

In at least one embodiment, a water treatment system, such as a desalination plant, can include a plant deck. In at least one embodiment, a desalination plant can include one or more intake lines. Each intake line can include an intake end submerged at least 400 feet below sea level. In at least one embodiment, a desalination plant can include an intake filter that filters the seawater entering each intake end of the intake lines. The intake filter can have a pore size of less than or equal to 5.0 mm. In at least one embodiment, a desalination plant can include a coarse filter unit, which can be positioned proximally to a first end of a top side of the plant deck. The coarse filter unit can have a pore size of less than or equal to 5.0 mm. In at least one embodiment, a desalination plant can include a plurality of reverse osmosis units, which can be positioned proximally to a second end of a top side of the plant deck. In at least one embodiment, a desalination plant can include a fine filter unit positioned on a top side of the plant deck, such as proximally to the coarse filter unit. The fine filter unit can have a pore size of less than or equal to 10.0 microns. In at least one embodiment, a desalination plant can include a first intake line in fluid communication with the intake filter, the coarse filter unit, the fine filter unit, and a first end of the reverse osmosis units. In at least one embodiment, a desalination plant can include a fresh water line that discharges potable water from a second end of the reverse osmosis units.

In at least one embodiment, a desalination plant can include a heavy brine line that discharges heavy brine from the reverse osmosis units. In at least one embodiment, a desalination plant can include a second intake line in fluid communication with the intake filter. The second intake line can transport filtered seawater from the intake filter to the heavy brine line where the filtered seawater dilutes the heavy brine discharged from the osmosis units. In at least one embodiment, a desalination plant can include a mixing device that mixes the heavy brine from the heavy brine line and the seawater entering the heavy brine line from the second intake line. In at least one embodiment, a desalination plant can include a submerged discharge line having a plurality of spaced apart dispersant units for limiting or controlling the output of brine within or among one or more areas, volumes or locations.

In at least one embodiment, a method, such as a method of producing potable fresh water, can include drawing seawater through at least one marine life extractor, which can be positioned at least 400 feet below a surface of a body of seawater. In at least one embodiment, the marine life extractor can be positioned at least 100 feet above a seabed of the body of seawater. In at least one embodiment, a method of producing potable fresh water can include pumping at least some of the seawater through at least one filter creating filtered seawater. In at least one embodiment, a method of producing potable fresh water can include pumping the filtered seawater through at least one desalination device creating fresh water and brine. In at least one embodiment, the desalination device can include a reverse osmosis device. In at least one embodiment, the desalination device can include a distillation device. In at least one embodiment, the desalination device can include an electro-dialysis device. In at least one embodiment, the desalination device can include a lithium extraction device.

In at least one embodiment, a method of producing potable fresh water can include mixing the brine with at least some of the seawater creating diluted brine. In at least one embodiment, effluent captured in the filter can be mixed with the brine before discharging the diluted brine. In at least one embodiment, a method of producing potable fresh water can include discharging the diluted brine at least 400 feet below the surface of the body of seawater. In at least one embodiment, the diluted brine can be discharged at least 100 feet above a seabed of the body of seawater. In at least one embodiment, effluent captured in the filter can be discharged within 100 feet of the surface of the body of seawater. In at least one embodiment, one or more minerals can be mined from effluent captured in the at least one filter.

In at least one embodiment, a desalination plant can include one or more marine life extractors, which can be positioned at least 400 feet below a surface of a body of seawater. In at least one embodiment, the marine life extractor can be positioned at least 100 feet above a seabed of the body of seawater. In at least one embodiment, a desalination plant can include a pump configured to draw seawater through the marine life extractor. In at least one embodiment, a desalination plant can include one or more filters configured to extract filtered seawater and effluent from the seawater. In at least one embodiment, a desalination plant can include one or more desalination devices configured to extract fresh water and/or brine from the filtered seawater. In at least one embodiment, the desalination device can include a reverse osmosis device. In at least one embodiment, the desalination device can include a distillation device. In at least one embodiment, the desalination device can include an electro-dialysis device. In at least one embodiment, the desalination device can include a lithium extraction device.

In at least one embodiment, a desalination plant can include a mixing device configured to mix the brine with at least some of the seawater creating diluted brine. In at least one embodiment, the mixing device can also be configured to mix effluent captured in the at least one filter with the brine. In at least one embodiment, a desalination plant can include a discharge pipe configured to discharge the diluted brine at least 400 feet below the surface of the body of seawater. In at least one embodiment, the discharge pipe can also be configured to discharge the diluted brine at least 100 feet above a seabed of the body of seawater. In at least one embodiment, a desalination plant can include an effluent pipe configured to discharge effluent captured in the filter within 100 feet of the surface of the body of seawater. In at least one embodiment, a desalination plant can include an extraction device for extracting one or more minerals from effluent captured in the filter.

Other and further embodiments utilizing one or more aspects of the disclosure can be devised without departing from the spirit of Applicant's disclosure. For example, the devices, systems and methods can be implemented for plants of numerous different sizes and configurations in numerous different locations and industries. Further, the various methods and embodiments of the disclosure can be included in combination with each other to produce variations of the disclosed methods and embodiments. Discussion of singular elements can include plural elements and vice versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicant, but rather, in conformity with the patent laws, Applicant intends to fully protect all such modifications and improvements that come within the scope or range of equivalents of the following claims.

What is claimed is:

1. A system for cleaning water, comprising:
   an intake configured to receive input water;
   a pump configured to move the input water through at least a portion of the system;
   at least one marine life extractor upstream of the pump and configured to be coupled to the intake;
   a discharge for discharging output water;
   an electromagnet configured to expose the input water to a magnetic field fluidically between the intake and the discharge;
   a course filter unit configured to filter the input water fluidically between the intake and the discharge;
   a nano-bubble injector configured to inject nanobubbles into the input water fluidically between the intake and the discharge;
   a ceramic ultrafiltration filter configured to filter the input water fluidically between the intake and the discharge;
   at least one desalination device downstream of the ceramic ultrafiltration filter, wherein the at least one desalination device is configured to extract fresh water and brine from filtered seawater;
   a mixing device downstream of the at least one desalination device, wherein the mixing device is configured to mix the brine with seawater to create a diluted brine; and
   a discharge pipe downstream of the mixing device, wherein the discharge pipe is configured to discharge the diluted brine below a surface of a body of seawater;
   wherein the magnetic field is upstream of the course filter unit, and the course filter unit is upstream of the nano-bubble injector; and
   wherein the nano-bubble injector is upstream of the ceramic ultrafiltration filter.

2. The system of claim 1, wherein the pump is upstream of the magnetic field.

3. The system of claim 1, further comprising at least one of a reverse osmosis device, a distillation device, an electro-dialysis device, a lithium extraction device, a thermal distillation device, and a combination thereof, plumbed fluidically between the ceramic ultrafiltration filter and the discharge.

4. The system of claim 1, further comprising a reverse osmosis device plumbed fluidically between the ceramic ultrafiltration filter and the discharge, and a lithium extraction device plumbed fluidically between the reverse osmosis device and the discharge.

5. The system of claim 1, wherein the at least one marine life extractor is configured to be disposed at least 400 feet below the surface of the body of seawater.

6. The system of claim 5, wherein the at least one marine life extractor is configured to be disposed at least 100 feet above a seabed of the body of seawater.

7. The system of claim 1, wherein the discharge pipe is configured to discharge the diluted brine at least 400 feet below the surface of the body of seawater.

8. The system of claim 7, wherein the discharge pipe is configured to discharge the diluted brine at least 100 feet above a seabed of the body of seawater.

9. The system of claim 1, wherein at least one of the course filter unit and the ceramic ultrafiltration filter is configured to extract effluent from the input water, and further comprising an extraction device downstream of the ceramic ultrafiltration filter, wherein the extraction device is configured to extract one or more minerals from the effluent.

10. The system of claim 9, further comprising an effluent pipe configured to discharge the effluent beneath the surface of the body of seawater.

11. The system of claim 1, wherein at least one of the course filter unit and the ceramic ultrafiltration filter is configured to extract effluent from the input water, and wherein the mixing device is configured to mix the effluent with at least one liquid.

12. The system of claim 11, wherein the mixing device is configured to mix the effluent with the brine.

13. The system of claim 11, further comprising a diluent input line fluidically coupled to the mixing device, wherein the mixing device is configured to mix the effluent with a diluent.

14. The system of claim 13, wherein the diluent input line is configured to route seawater to the mixing device.

15. The system of claim 1, wherein the body of seawater is the ocean.

16. A system for cleaning water, comprising:
an intake configured to receive input water;
a pump configured to move the input water through at least a portion of the system;
at least one marine life extractor upstream of the pump and configured to be coupled to the intake;
a discharge for discharging output water;
an electromagnet configured to expose the input water to a magnetic field fluidically between the intake and the discharge;
a course filter unit configured to filter the input water fluidically between the intake and the discharge;
a nano-bubble injector configured to inject nanobubbles into the input water fluidically between the intake and the discharge;
a ceramic ultrafiltration filter configured to filter the input water fluidically between the intake and the discharge;
at least one desalination device downstream of the ceramic ultrafiltration filter, wherein the at least one desalination device is configured to extract fresh water and brine from filtered seawater and comprises a reverse osmosis device;
a mixing device downstream of the at least one desalination device, wherein the mixing device is configured to mix the brine with seawater to create a diluted brine; and
a discharge pipe downstream of the mixing device, wherein the discharge pipe is configured to discharge the diluted brine below a surface of a body of seawater;
wherein the magnetic field is upstream of the course filter unit, and the course filter unit is upstream of the nano-bubble injector; and
wherein the nano-bubble injector is upstream of the ceramic ultrafiltration filter.

17. The system of claim 16, further comprising a lithium extraction device plumbed fluidically between the reverse osmosis device and the discharge.

18. A system for cleaning water, comprising:
an intake configured to receive input water;
a pump configured to move the input water through at least a portion of the system;
at least one marine life extractor upstream of the pump and configured to be coupled to the intake;
a discharge for discharging output water;
an electromagnet configured to expose the input water to a magnetic field fluidically between the intake and the discharge;
a course filter unit configured to filter the input water fluidically between the intake and the discharge;
a nano-bubble injector configured to inject nanobubbles into the input water fluidically between the intake and the discharge;
a ceramic ultrafiltration filter configured to filter the input water fluidically between the intake and the discharge;
at least one desalination device downstream of the ceramic ultrafiltration filter, wherein the at least one desalination device is configured to extract fresh water and brine from filtered seawater and comprises at least one of a reverse osmosis device, a distillation device, an electro-dialysis device, and a combination thereof;
a mixing device downstream of the at least one desalination device, wherein the mixing device is configured to mix the brine with seawater to create a diluted brine; and
a discharge pipe downstream of the mixing device, wherein the discharge pipe is configured to discharge the diluted brine below a surface of a body of seawater;
wherein the magnetic field is upstream of the course filter unit, and the course filter unit is upstream of the nano-bubble injector; and
wherein the nano-bubble injector is upstream of the ceramic ultrafiltration filter.

19. The system of claim 18, further comprising at least one of a lithium extraction device, a thermal distillation device, and a combination thereof, plumbed fluidically between the ceramic ultrafiltration filter and the discharge.

* * * * *